United States Patent
Shen et al.

(10) Patent No.: US 8,918,069 B2
(45) Date of Patent: *Dec. 23, 2014

(54) COMPACT WIDE DYNAMIC RANGE TRANSMITTER FOR POINT TO POINT RADIO

(75) Inventors: Ying Shen, Chapel Hill, NC (US); James Laudolff, Issaquah, WA (US); Travis Mashburn, Cary, NC (US); Todd Nichols, Cary, NC (US); David C. Schafer, Indian Harbour Beach, FL (US); Thanh H. Nguyen, Dollard-des Ormeaux (CA)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,629

(22) Filed: Jan. 10, 2012

(65) Prior Publication Data
US 2012/0295561 A1 Nov. 22, 2012

Related U.S. Application Data

(63) Continuation of application No. 11/750,231, filed on May 17, 2007, now Pat. No. 8,095,088.

(51) Int. Cl.
*H04B 1/04* (2006.01)
*H01Q 11/12* (2006.01)

(52) U.S. Cl.
CPC .................................. *H04B 1/0475* (2013.01)
USPC ........... 455/114.3; 455/126; 330/75; 375/296

(58) Field of Classification Search
USPC ..................... 455/114.3, 126; 330/75, 149; 375/296–297
See application file for complete search history.

(56) References Cited

U.S. PATENT DOCUMENTS

| | | |
|---|---|---|
| 4,961,190 A | 10/1990 | Nakajima |
| 5,125,008 A | 6/1992 | Trawick et al. |
| 5,230,097 A | 7/1993 | Currie et al. |
| 5,329,520 A | 7/1994 | Richardson et al. |
| 5,437,051 A | 7/1995 | Oto |
| 5,451,818 A | 9/1995 | Chan et al. |
| 5,740,157 A | 4/1998 | Demiray et al. |

(Continued)

FOREIGN PATENT DOCUMENTS

| | | |
|---|---|---|
| JP | 7249944 | 9/1995 |
| JP | 2003078356 | 3/2003 |

OTHER PUBLICATIONS

Search Report and Written Opinion mailed May 20, 2008 from International Serial No. PCT/US2008/051210 filed Jan. 16, 2008.

(Continued)

*Primary Examiner* — Lee Nguyen
(74) *Attorney, Agent, or Firm* — Sheppard, Mullin, Richter & Hampton LLP

(57) ABSTRACT

A radio frequency transmitter comprising a modem which receives one or more input data signals and an adaptive predistortion signal and provides a baseband in-phase signal and a baseband quadrature signal. The transmitter may comprise a power amplifier module which receives the in-phase and quadrature phase signals and provides a radio frequency output signal. A predistortion module receives the radio frequency signal, downconverts the radio frequency signal to an intermediate frequency signal, and downconverts the intermediate frequency signal to a baseband feedback signal. The transmitter samples the feedback signal and provides an adaptive predistortion signal to the modem.

18 Claims, 26 Drawing Sheets

(56) References Cited

U.S. PATENT DOCUMENTS

| | | | |
|---|---|---|---|
| 5,742,639 A | 4/1998 | Fasulo et al. | |
| 5,770,971 A | 6/1998 | McNicol | |
| 5,774,784 A | 6/1998 | Ohno | |
| 5,797,043 A | 8/1998 | Lewis et al. | |
| 5,822,553 A | 10/1998 | Gifford et al. | |
| 5,956,324 A | 9/1999 | Engdahl et al. | |
| 5,991,312 A | 11/1999 | Koenig et al. | |
| 6,032,032 A | 2/2000 | Kato et al. | |
| 6,114,986 A | 9/2000 | Cassen et al. | |
| 6,366,622 B1 | 4/2002 | Brown et al. | |
| 6,498,551 B1 | 12/2002 | Ammar et al. | |
| 6,513,092 B1 | 1/2003 | Gorshe | |
| 6,531,982 B1 | 3/2003 | White et al. | |
| 6,560,202 B1 | 5/2003 | Bordogna et al. | |
| 6,563,883 B1 | 5/2003 | Leinonen et al. | |
| 6,594,479 B2 | 7/2003 | Ammar et al. | |
| 6,603,810 B1 | 8/2003 | Bednekoff et al. | |
| 6,687,217 B1 | 2/2004 | Chow et al. | |
| 6,687,312 B1 | 2/2004 | Davies | |
| 6,819,720 B1 | 11/2004 | Willetts | |
| 6,941,118 B2 * | 9/2005 | Yamamoto | 455/126 |
| 6,943,627 B2 | 9/2005 | Leyonhjelm et al. | |
| 6,947,711 B1 | 9/2005 | Leyonhjelm | |
| 6,950,654 B2 | 9/2005 | Jao et al. | |
| 6,998,708 B2 | 2/2006 | Ammar | |
| 7,016,435 B2 | 3/2006 | Adachi | |
| 7,031,409 B2 | 4/2006 | Brobston et al. | |
| 7,058,369 B1 | 6/2006 | Wright et al. | |
| 7,099,399 B2 | 8/2006 | McCallister | |
| 7,325,158 B2 | 1/2008 | Tillmanns | |
| 7,372,804 B2 | 5/2008 | Arikawa et al. | |
| 7,609,728 B2 | 10/2009 | Arikawa et al. | |
| 7,633,858 B2 | 12/2009 | Semaan et al. | |
| 7,689,180 B2 * | 3/2010 | Grundlingh et al. | 455/126 |
| 7,701,847 B2 | 4/2010 | Chen et al. | |
| 7,782,765 B2 | 8/2010 | Nguyen et al. | |
| 7,984,217 B2 | 7/2011 | Beckhoff et al. | |
| 2001/0046239 A1 | 11/2001 | Colombo et al. | |
| 2002/0093393 A1 | 7/2002 | Henningsson et al. | |
| 2002/0097737 A1 | 7/2002 | Traverso et al. | |
| 2002/0111150 A1 | 8/2002 | Pleasant et al. | |
| 2002/0123364 A1 | 9/2002 | Palmeri et al. | |
| 2002/0154620 A1 | 10/2002 | Azenkot et al. | |
| 2003/0162522 A1 | 8/2003 | Valtolina et al. | |
| 2003/0199283 A1 | 10/2003 | Busch | |
| 2004/0052320 A1 | 3/2004 | Lennen | |
| 2004/0203709 A1 | 10/2004 | Luneau | |
| 2004/0263378 A1 | 12/2004 | Jossef et al. | |
| 2005/0053008 A1 | 3/2005 | Griesing et al. | |
| 2005/0105642 A1 | 5/2005 | Muller et al. | |
| 2005/0156662 A1 | 7/2005 | Raghupathy et al. | |
| 2005/0195919 A1 | 9/2005 | Cova | |
| 2005/0243712 A1 | 11/2005 | MacKinnon et al. | |
| 2005/0260961 A1 | 11/2005 | Cowley et al. | |
| 2006/0049870 A1 | 3/2006 | Hellberg | |
| 2006/0078069 A1 | 4/2006 | Seendripu et al. | |
| 2006/0089114 A1 | 4/2006 | Maxim et al. | |
| 2006/0112075 A1 | 5/2006 | Hellerstein et al. | |
| 2006/0112175 A1 | 5/2006 | Sellers et al. | |
| 2006/0141974 A1 | 6/2006 | Campbell et al. | |
| 2006/0159010 A1 | 7/2006 | Yamaguchi et al. | |
| 2006/0223474 A1 | 10/2006 | Yoshizaki et al. | |
| 2007/0019109 A1 | 1/2007 | Lombardi et al. | |
| 2007/0064835 A1 | 3/2007 | Auranen | |
| 2007/0076818 A1 | 4/2007 | Barnes et al. | |
| 2008/0267325 A1 | 10/2008 | Jou | |
| 2009/0185482 A1 | 7/2009 | Yang et al. | |

OTHER PUBLICATIONS

Search Report and Written Opinion mailed Jul. 7, 2008 from International Serial No. PCT/US2008/052359 filed Jan. 29, 2008.
Search Report and Written Opinion mailed Apr. 11, 2008 from International Serial No. PCT/US2007/088655 filed Dec. 21, 2007.

* cited by examiner

COMPACT WIDE DYNAMIC RANGE TRANSMITTER FOR POINT TO POINT RADIO

RELATED APPLICATIONS

This application is a continuation application of U.S. application Ser. No. 11/750,231, filed May 17, 2007 now U.S. Pat. No. 8,095,088, entitled "Compact Wide Dynamic Range Transmitter For Point To Point Radio" and related to U.S. application Ser. No. 11/670,952, filed Feb. 2, 2007, entitled "Packaging for Low-Cost, High-Performance Microwave and Millimeter Wave Modules," the entirety of which is incorporated herein by reference. The instant application is related to U.S. application Ser. No. 11/655,837, filed Jan. 22, 2007, entitled "Distribution Protection Switching Architecture for Point-to-Point Microwave Radio Systems," the entirety of which is incorporated herein by reference. The instant application is related to U.S. application Ser. No. 11/750,209, filed May 17, 2007, entitled "Compact Dual Receiver Architecture For Point To Point Radio," the entirety of which is incorporated herein by reference.

BACKGROUND

Electrical signals have proven to be an effective means of conveying data from one location to another. The further a signal is transmitted, however, the greater the decay in the signal and the greater the chance for irreversible loss in the data represented by the signal. In order to guard against this signal decay, the core electrical signal that represents the data (i.e., the baseband signal) may be modulated or superimposed on a carrier wave in the Radio Frequency ("RF") frequency spectrum.

In order to properly interpret the signal, conventional RF receivers extract the baseband signal from the received signal. The data represented by the extracted baseband signal may then be interpreted by other downstream circuitry. In order to perform this extraction, typical receivers include circuitry which first converts the received radio frequency modulated signal into an intermediate frequency ("IF") signal. This IF signal is then converted into the baseband signal for further data processing. Receiver architectures that convert through the intermediate frequency are often called "heterodyne" receiver architectures. Naturally, circuit elements (called "IF components") are required in order to deal with the intermediate conversion to and from the intermediate frequency.

It is desirable to reduce the cost, size, and power consumption of a particular receiver architecture design for strategic marketing of the receiver. One technology developed in order to reduce RF receiver cost, size, and power consumption is generally termed direct conversion. Direct conversion refers to the direct conversion of RF modulated signals into corresponding baseband signals without requiring conversion through the intermediate frequency. Such direct conversion receiver architectures are often also called zero-IF, synchrodyne, or homodyne receiver architectures.

FIG. 1 is an illustration of a conventional direct conversion circuit 100 in accordance with the prior art. With reference to FIG. 1, the circuit 100 includes an antenna 101 which receives the RF modulated signal. The antenna 101 then provides the received signal to an amplifier 102 which amplifies the signal for further processing. The amplifier 102 may be, for example, an RF low noise amplifier. The amplified signal is then split into two branches, an in-phase ("I") branch 110, and a quadrature-phase ("Q") branch 120. Each branch includes a mixer that initially receives the amplified signal. For instance, the in-phase branch 110 includes an in-phase mixer 111, and the quadrature-phase branch 120 includes a quadrature-phase mixer 121. A local oscillator 130 generally provides a sine or square wave signal as a control signal to each of the mixers. Each mixer is configured to nonlinearly process the amplified signal and control signal, resulting in output signal components at frequencies equal to the sum and difference of amplified signal and control signal frequencies, plus higher-order components at other frequencies. The circuit includes a ninety degree phase shifter 131 which causes the control signal for the quadrature-phase mixer 121 to be ninety degrees out of phase with the control signal for the in-phase mixer 111. The signal from the in-phase mixer 111 is then passed through a low pass filter 112 to a baseband amplifier 113 to complete the extraction of the baseband signal from the received signal as far as the in-phase branch 110 is concerned. Likewise, the signal from the quadrature-phase mixer 121 is passed through a low pass filter 122 to a baseband amplifier 123 to complete the extraction of the baseband signal as far as the quadrature-phase branch is concerned. The in-phase and quadrature-phase baseband signals are then processed by signal processing circuitry 150.

A conventional intermediate conversion circuit in accordance with the prior art would be similar to the direct conversion circuit of FIG. 1 with the addition of IF components to convert the received modulated RF signal through an intermediate frequency. While direct conversion circuits may generally be smaller and require less power than conventional heterodyne receiver architectures, direct conversion architectures characteristically introduces more DC offset and 1/f noise than do heterodyne receiver architectures thereby limiting dynamic range.

Furthermore, it is often desirable to implement antenna diversity in any receiver architecture. Antenna diversity involves the use of more than one antenna to receive a signal to improve the ability to properly receive the signal. When using one antenna to receive a signal, the signal may have actually taken several paths from the transmitter to the receiver, each having a different length. This causes an echo effect that might actually lead to destructive interference between the signals receive from different paths. The use of two or more antennas that are appropriately spaced reduces the degradation due to the echo effect since the echo at one antenna will typically be different than the echo at another, thereby reducing the likelihood that the echo would degrade the signal.

Thus, a continuing need exists for an improved receiver architecture, particularly for microwave and. millimeter wave systems operating in higher frequency ranges. As greater uses are made for microwave and millimeter wave radio systems, it would be advantageous if a unique receiver architecture could be found that addressed the low cost and performance requirements in the area of millimeter wave and microwave communications systems without degradation to the technical performance of a respective transceiver, transmitter, or receiver and/or communication, system.

SUMMARY

Various embodiments of the. present, invention are based, in part, on the foregoing observations. Examples of such embodiments are provided herein.

Specifically, one embodiment of the present subject matter provides a radio frequency transmitter comprising a modem which receives one or more input data signals and an adaptive predistortion signal and provides a baseband in-phase ("I") signal and a baseband quadrature ("Q") signal. A power amplifier module receives the I and Q signals and provides a radio frequency ("RF") output signal. A predistortion module receives the RF signal, downconverts the RF signal to an intermediate frequency ("IF") signal, downconverts the IF signal to a baseband feedback signal, and samples the feedback signal to provide the adaptive predistortion signal to the modem. An alternative embodiment may further comprise a dynamic range power control module including a root-mean-squared ("RMS") power detector and a variable attenuator operating on the IF signal. An additional embodiment may further comprise a dual loop synthesizer, and a temperature compensation module including a first temperature sensor located in proximity to an RF detector circuit and a second temperature sensor located in proximity to the power amplifier module.

Another embodiment of the present subject matter provides a radio frequency transmitter system comprising an electronics rack having an electrical backplane and a plurality of radio frequency transmitters each operatively connected to the backplane. The transmitters may each comprise a modem which receives one or more input data signals and an adaptive predistortion signal and provides a baseband I and Q signal. A power amplifier module receives the I and Q signals and provides an RF output signal. A predistortion module receives the RF signal, downconverts the RF signal to an IF signal, downconverts the IF signal to a baseband feedback signal, and samples the feedback signal to thereby provide the adaptive predistortion signal to the modem. The transmitters may further comprise a local reference signal generator and a frequency locking circuit. Alternative embodiments of the radio frequency system may comprise a data processing unit ("DPU") operatively connected to the backplane having a first and a second common reference signal generator where each local reference generator may be switchably connected to the first common reference signal generator via the frequency locking circuit.

An additional embodiment of the present subject matter provides a method for transmitting a signal. The method comprises the steps of providing a co-located modem and transmitter in an assembly, receiving data and a pre-distortion signal in the co-located modem to provide a first signal, and converting the first signal to a baseband signal. The method further comprises providing a synthesizer that generates plural reference signals for use by the modem and transmitter, modulating the baseband signal, and amplifying the modulated signal with an amplifier. The method also comprises demodulating the amplified signal with distortion circuitry to provide the pre-distortion signal, and transmitting the amplified signal with a transmitter. An additional embodiment may provide bias points of the amplifier during thermal control. Alternative embodiments may also compensate the modulated signal for temperature changes in the amplifier and provide a common reference signal to the modem and transmitter. Alternative embodiments may lock the local oscillator to a reference frequency as a function of an alarm and also calibrate the amplified signal. The method may further comprise switching to a. standby transmitter to transmit the amplified signal if the transmitter fails.

These embodiments and many other features and advantages thereof will be readily apparent to one skilled in the art to which the invention pertains from a perusal of the claims, the appended drawings, and the following detailed description of the embodiments.

DETAILED DESCRIPTION

Figure 1:
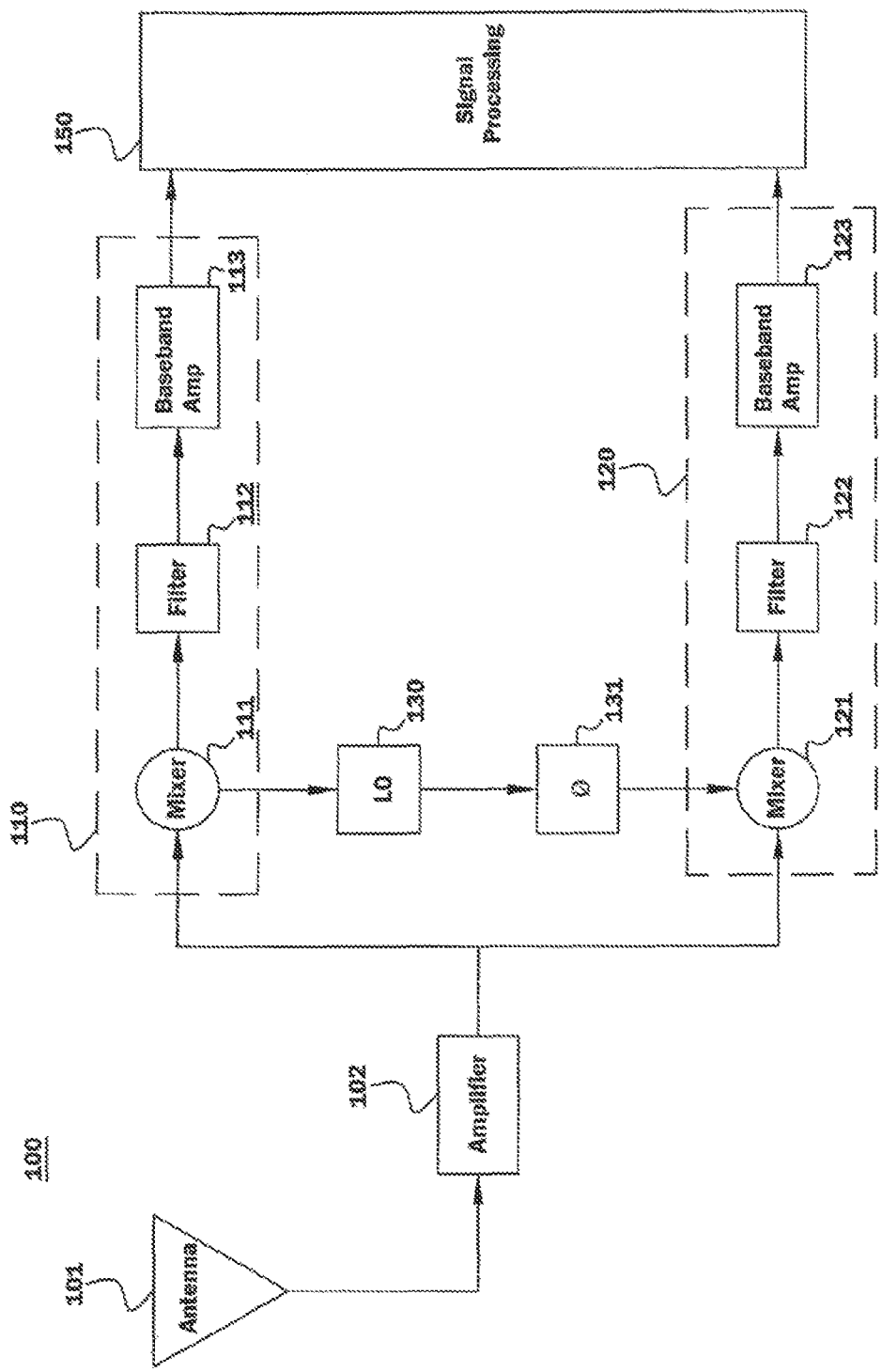
FIG. 1 is an illustration of a conventional direct conversion circuit, in accordance with the prior art.

With reference to the figures where like elements have been given like numerical designations to facilitate an understanding of the present subject matter, the various embodiments of a system, method and apparatus for a radio frequency transmitter are herein described.

The present subject matter generally describes a radio frequency ("RF") system adaptable to communicate in the 6-11 GHz frequency bands. The RF system may be capacity/modulation independent and support a capacity range of, but not limited to, 8T1 through 4DS3 and support modulation such as, but not limited to, 32 QAM through 256 QAM. The aforementioned frequency bands and ranges are exemplary only and should not in any way limit the scope of the claims appended herewith. The RF system may be configured as an indoor radio or an outdoor radio and may be partitioned onto a signal processing unit and an RF unit. The RF unit may generally connect to an antenna unit through a coupler such as an antenna coupling unit. Interconnections between the RF unit and signal processing unit may generally be via a back plane. The RF unit may be optimized for separate transmitter and receiver operation for the consideration of minimum traffic interruption when there is a failure in either direction. Further, for cost and performance considerations, the transmitter may be co-located with a modulator and digital-to-analog converter ("DAC"), and the receiver is co-located, with a demodulator and analog-to-digital converter ("ADC"). Furthermore, the receiver aspect may be optimized for a plurality of receivers. The co-location aspect of the of modulator or modem and transmitter provides a significant advantage with regard to prior art radio systems. For example, in current synchronous digital hierarchy ("SDH") radios, modem and IF/RF circuitry are at different locations and the IF is provided as an interface. With the co-location of the modem and IF/RF circuitry, the amount of upconversion and other circuitry may be reduced, the overall design may be simplified, and the overall degradation may be minimized which ensures a more reliable and feasible adaptive pre-distortion architecture.

An exemplary radio system may provide a plurality of radio configurations. For example, a radio system according to the present subject matter may be non-protected ("NP") (e.g., N+0, N=1 to 4, etc.), NP with space diversity, monitored hot standby ("MHSB") with and/or without space diversity; MHSB with split transmit with and/or without space diversity, hybrid diversity, frequency diversity (e.g., 1:N, N=3, etc.), and cross polarization interference cancellation ("XPIC"). For example, in the case of MHSB, two receiver RF couplers may be utilized such as an equal loss splitter or an unequal loss coupler having a predetermined differential loss between the main and standby receivers. Antenna coupler units may support configurations of transmitters and/or receivers having the same or split polarization and may be mounted as a function of RF system gain.

An exemplary RF unit may comprise an antenna coupling unit, the appropriate mounting mechanics, a transmitter, transceiver, and/or receiver. Depending upon the various antenna coupling unit and diplexer configurations, the RF unit may be configured into NP, MHSB, frequency diversity, space diversity and hybrid diversity. The RF unit may be utilized in indoor and/or outdoor applications and generally, the corresponding antenna(s) may be mounted in an outdoor environment and separately from the RF unit with an extended waveguide connection thereto. Of course, if the RF unit is positioned in the outdoor environment, the RF unit may be integrated with an antenna.

Figure 2:
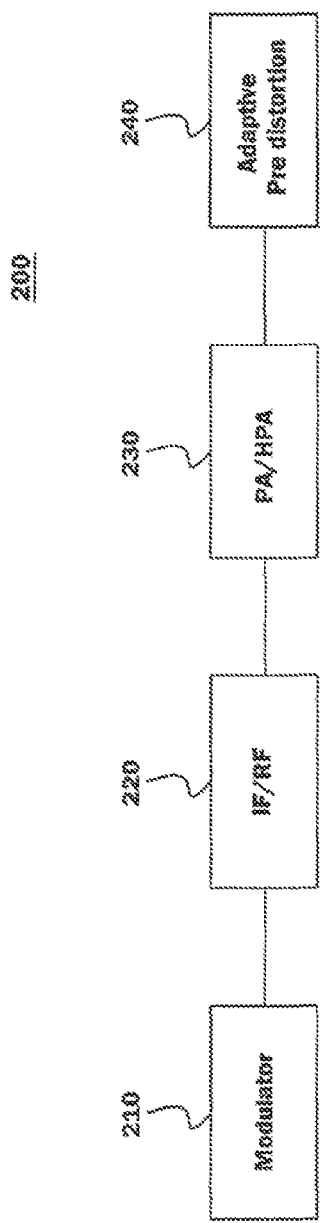
FIG. 2 is a block diagram of a transmitter according to an embodiment of the present subject matter.

FIG. 2 is a functional diagram of a transmitter according to an embodiment of the present subject matter. With reference to FIG. 2, a transmitter 200 may generally comprise tour primary functional blocks including, but not limited to, a modulator 210, transmitter IF/RF processing circuitry 220, power amplification or high power amplification circuitry 230, and/or adaptive pre-distortion feedback circuitry 240. Exemplary transmitters according to embodiments of the present subject matter may provide fully agile radio over a wide range of frequency bands, may be capacity/modulation independent, and provide remote RF synthesizer frequency settings and transmit output power settings. Further embodiments may provide remote system diagnostics, automatic transmit power control ("ATPC"), remote transmit power control ("RTPC") thermal management in an ATPC/RTPC mode, and adaptive pre-distortion functions. Alternative embodiments may provide in-service error vector magnitude ("EVM") measurement, an RF monitor port, a highly integrated RF/modulator transmitter, an output power field adjustable/settable feature though the RF monitoring port, coherent transmitters within the same radio shelf, and a continuous, wave ("CW") mode. Embodiments of the present subject matter may also support the transmitter specifications listed below in Table 1; however, such a listing should not in any way limit the scope of the claims appended herewith.

TABLE 1

| | |
|---|---|
| Frequency bands | 6 GHz: 5725-7125 MHz |
| | 7/8 GHz: 7110-8500 MHz |
| | 10/11 GHz: 10500-11700 MHz |
| IM3 at LPA/PA/HPA port LPA: | −41 dBc min. |
| 6 GHz: 23.5 dBm | |
| 7/8 GHz: 22.5 dBm | |
| 10/11 GHz: 20 dBm | |
| Standard PA: | |
| 6 GHz: 29.5 dBm | |
| 7/8 GHz: 28.5 dBm | |
| 10/11 GHz: 26 dBm | |
| HPA: | |
| 6 GHz: 32.5 dBm | |
| 7/8 GHz: 31.5 dBm | |
| 10/11 GHz: 29 dBm | |
| Transmitter Power Tolerance (the difference between custom target vs. actual measured power) | At 0 dB attenuation |
| | +/−0.5 dB (over temp. range of 20 C. to 30 C.) |
| | +/−1.5 dB (T < 20 C. or T > 30 C.) |
| | From 1 dB-30 dB attenuation |
| | +/−1 dB (over temp range of 20 C. to 30 C.) |
| | +/−2 dB (over temp range of 20 C. to 30 C.) |
| Transmitter Display Accuracy (the difference between custom display power vs. actual measured power) | At 0 db attenuation |
| | +/−1 dB (over temp. range of 20 C. to 30 C.) |
| | +/−2 dB (T < 20 C. or T > 30 C.) |
| | From 1 db-30 dB attenuation |
| | +/−1.5 dB (over temp range of 20 C. to 30 C.) |
| | +/−2.5 dB (over temp range of 20 C. to 30 C.) |
| Transmitter power dynamic range control | 30 dB for all modulation |
| RTPC range | 10 dB for all modulation |
| Output power mute | >=50 dBc, (less than = 38 dBm) |
| Output power mute activation | Through software control |
| Output power attenuation resolution | 1 dB step through software control |
| Output power level control | Programmable |
| Frequency Source/LO | Synthesizable |
| Frequency step size | 5 kHz for 6/7/8 GHz |
| | 125 kHz for 10/11 GHz |
| Frequency setting | Programmable through software control |
| Frequency tuning range | Full band per 6 GHz, 7/8 GHZ and 10/11 GHz |
| Frequency stability (including 5 years aging) | <=+/−3 ppm, including aging and temperature variation |
| Synthesizer/LO alarm indication | Reported through microprocessor |
| Power output alarm | Reported through microprocessor |

TABLE 1-continued

| | |
|---|---|
| RF Unit Group Delay Distortion | Slope: 30 MHz < 6 ns |
| | Parabolic: 50 MHz < 50 ns |
| | 40 MHz < 15 ns |
| | 50 MHz < 25 ns |
| RF Unit amplitude response in any given specific bandwidth within the whole frequency range | Slope: 30 MHz < 0.5 dB |
| | Parabolic: 50 MHz < 1.0 dB |
| | 40 MHz < 1.0 dB |
| | 50 MHz < 1.5 dB |
| Integrated Phase Noise (SSB) | IPN 25 kHz to 1 MHz: −41.45 dBc/ |
| | 0.48 deg. (32QAM) |
| | IPN 75 kHz to 5 MHz: −44.44 dBc/ |
| | 0.34 deg. (64QAM) |
| | IPN 40 kHz to 2 MHz: −47.61 dBc/ |
| | 0.24 deg. (128QAM) |
| | IPN 250 kHz to 10 MHz: −50.49 dBc/ |
| | 0.17 deg. (256QAM) |
| Phase hit over temp, for frequency jump | 7 KHz max. |
| 2nd RF harmonic level | <=−50 dBm when F <= 21.2 GHz |
| | <=−30 dBm when F > 21.2 GHz |
| Return Loss at transmitter port | 15 dB min. |
| Transmitter mask at antenna port | All T-rates: FCC |
| | STM01: ETSI EN 302 217-2-2, Class 5B |
| Unmute Rise Time | 5 ms max. |
| Transmitter spurious at antenna port | All T-rates: FCC emission mask |
| | STM01: ETSI EN 302 217-2-2 |
| | (section 4.2.6&4.3.3) |

Figure 3:
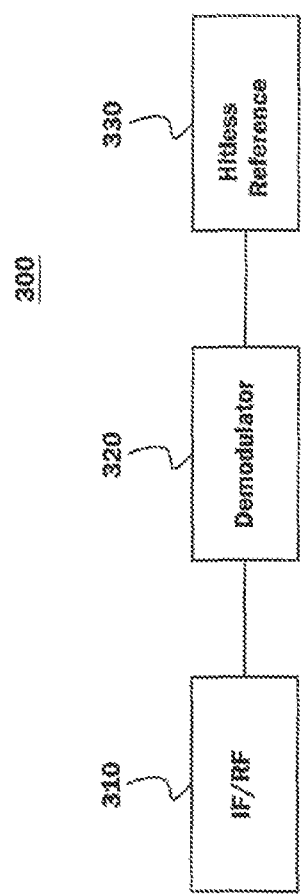
FIG. 3 is a block diagram of a receiver according to an embodiment of the present subject matter.

FIG. 3 is a functional diagram of a receiver according to an Embodiment of the present subject matter. With reference to FIG. 3, a receiver 300 may generally comprise of three primary functional blocks including, but not limited to, receiver IF/RF processing circuitry 310, a demodulator 320 and/or hitless reference circuitry for an XPIC option 230. Exemplary receivers according to embodiments of the present subject matter may provide fully agile radio over a wide range of frequency hands, may be capacity/modulation independent, and provide remote RF synthesizer frequency settings. Further embodiments may provide remote system, diagnostics, a hitless receiver for cross polarization interference cancellation ("XPIC") applications, a dual port receiver for 1:N space diversity, and a DFM test port. Alternative embodiments may provide a highly integrated RF/demodulator receiver, a received signal strength Indicator ("RSSI") monitor port, and provide coherent receivers within the same radio shelf.

Figure 4:
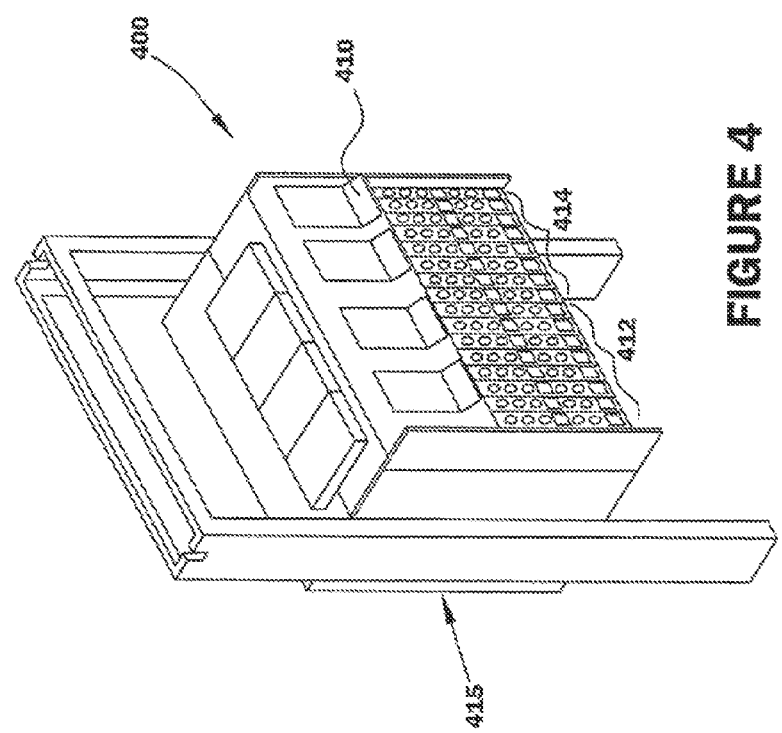
FIG. 4 is an illustration of a radio shelf according to an embodiment of the present subject matter.

An exemplary RF unit may be designed for simple assembly and ease of manufacturing, installation, alignment and replacement and for environmental protection. For example, the housing design of both the transmitter and/or receiver may be comprised of a die-cast enclosure acting as a heat sink and one cover, The transmitter and/or receiver may provide front accessibility for module replacement and rear accessibility for connection to an antenna(s). Exemplary RF units and modules are described in co-pending U.S. application Ser. No. 11/670,952, filed Feb. 2, 2007, and entitled "Packaging for Low-Cost, High-Performance Microwave and Millimeter Wave Modules," the entirety of which is incorporated herein by reference. Plural units 410 or modules of the embodiments described in U.S. application Ser. No. 11/670,952 may be mounted in the same radio shelf 400 depicted in FIG. 4. For example, one radio shelf 400 may accommodate four transmitters 412 and four dual receivers 414 in a single rack 415. While not shown, one radio shelf 400 may also support multiple racks, Embodiments of the present subject matter may thus provide dual receivers in one package. Additional embodiments may provide a single receiver, dual receivers for space diversity configuration and/or dual receivers for XPIC configuration. This dual receiver optimization approach may thus greatly reduce space concerns, provide for shared common key circuitry, reduce interconnections, minimize the overall size and provide a single radio shelf to support plural transmitters and receivers while meeting thermal and power consumption requirements.

Figure 5:
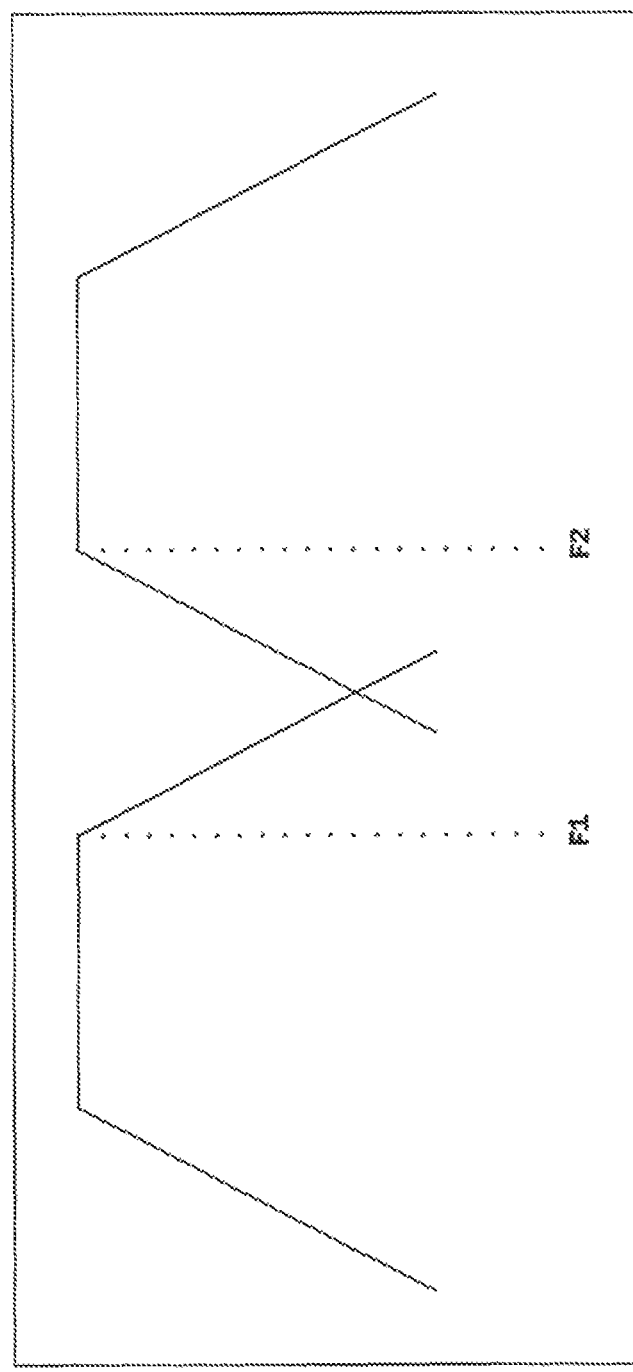
FIG. 5 is a frequency response graph of an antenna coupler unit according to an embodiment of the present subject matter.

If a single antenna is utilized in a radio system employing embodiments of the present subject matter, a passive antenna coupling unit may be employed, to perform the separation of transmit and receive signals into and out of an antenna. Depending upon the transmit/receive frequency separation, operating channels, and offered configurations as described above, several antenna, coupling unit, options may be available. For example, a typical NP antenna coupling unit may include one transmit waveguide filter, one transmit isolator, on receiver waveguide filter, one receiver isolator and one match load. Additionally, in a protected radio, a switch may be utilized for connecting the two transmitter ends to the antenna coupling unit and an equal or unequal couple may feed the receive signal to the two receiver ends. FIG. 5 is a frequency response graph of an antenna coupler unit according to an embodiment of the present subject matter. With reference to FIG. 5, F1 represents the transmitter filter high edge frequency and F2 represents die receiver filter low edge frequency. Thus, the rejection F2 from F1 for a complete transmitter antenna coupling unit may be 72 dB minimum, the rejection F1 from F2 for the receiver antenna coupling unit is 63 dB, and an associated circulator may possess a minimum of 25 dB rejection.

Embodiments of the present subject matter may support the antenna coupling unit configurations listed below in Table 2; however, such a listing should not in any way limit the scope of the claims appended herewith.

TABLE 2

| Description | Mechanical |
|---|---|
| Non-protected (Tx/Rx) | One transmitter, one receiver and one antenna |
| Non-protected Tx, Space Diversity Rx (Tx/Rx, Rx) | One transmitter, two receivers and two antennas |
| Hot Standby Protected Txs and Rxs (Tx/Rx) | Two transmitters, two receivers and one antenna |
| Hot Standby Protected Txs, Space Diversity Rxs (Tx/Rx, Rx) | Two transmitters, two receivers and two antennas |

TABLE 2-continued

| Description | Mechanical |
| --- | --- |
| Hot Standby Protected Split Txs and Diversity Rxs (Tx/Rx, Tx/Rx) | Two transmitters, two receivers and two antennas |
| Hot Standby, Separate Tx and Rx Antennas (Tx/Rx, Rx/Rx) | Two transmitters, two receivers and two antennas |
| Frequency Diversity Txs and Rxs, Single Antenna (Tx/Tx/Rx/Rx) | Two transmitters, two receivers and two antennas |
| Frequency Diversity Txs and Rxs, Dual Antenna (Tx/Tx, Rx/Rx) | Two transmitters, two receivers and one antenna |
| Non-protected Tx and Rx, Separate Antenna (Tx, Rx) | One transmitter, one receiver and two antennas |
| Hot Standby Protected Txs, Space Diversity Rxs, Three Antennas (Tx, Rx, Rx) | Two transmitters, two receivers and three antennas |
| Non Protected Tx, Space Diversity Rxs, Three Antennas (Tx, Rx, Rx) | One transmitter, two receivers and three antennas |
| 1:3 Frequency Diversity Txs (Txs, Rxs) | Four transmitters, four receivers and two antennas |
| 1:3 Frequency Diversity Txs, Space Diversity Rxs, Three Antennas (Txs, Rxs, Rxs) | Four transmitters, eight receivers and three antennas |

Figure 6:
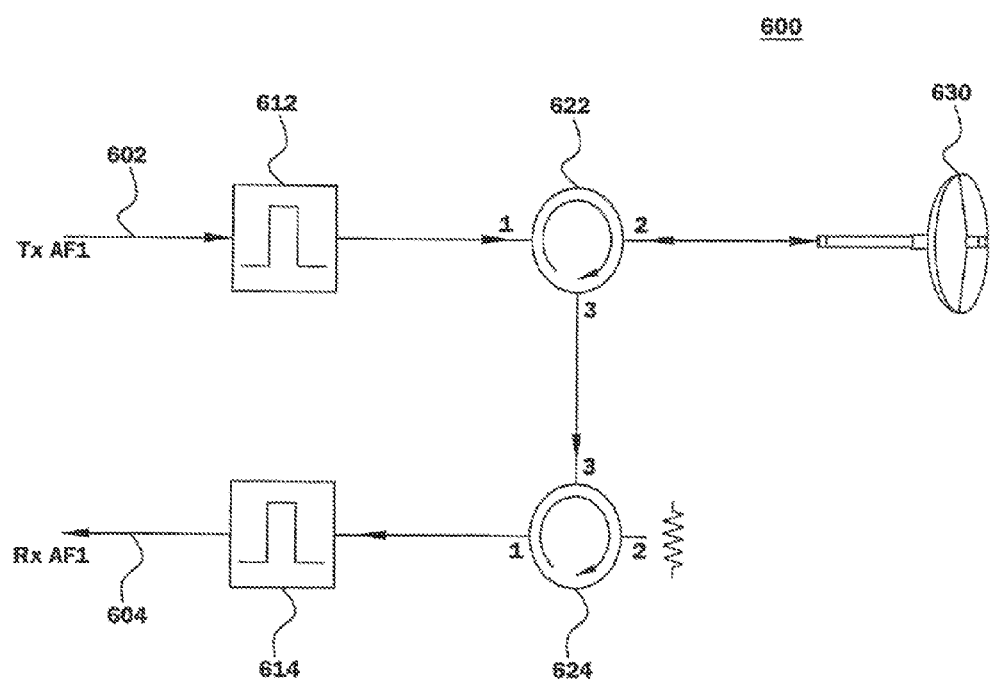
FIGS. 6-18 are simplified diagrams of antenna coupling unit configurations according to embodiments of the present subject matter.

FIGS. 6-18 are simplified block diagrams of the antenna coupling unit configurations identified in Table 2 according to embodiments of the present subject matter. With reference to FIG. 6, a Non-protected Tx and Rx (Tx/Rx) antenna coupling unit configuration 600 is illustrated. The configuration may comprise one non-protected transmitter branch 602 having a corresponding transmit filter 612 connected to a circulator 622. The configuration may further comprise one non-protected receiver branch 604 having a corresponding receive filter 614 connected to a circulator 624 wherein the circulators 614, 624 route the appropriate signals to/from, an antenna 630.

Figure 7:
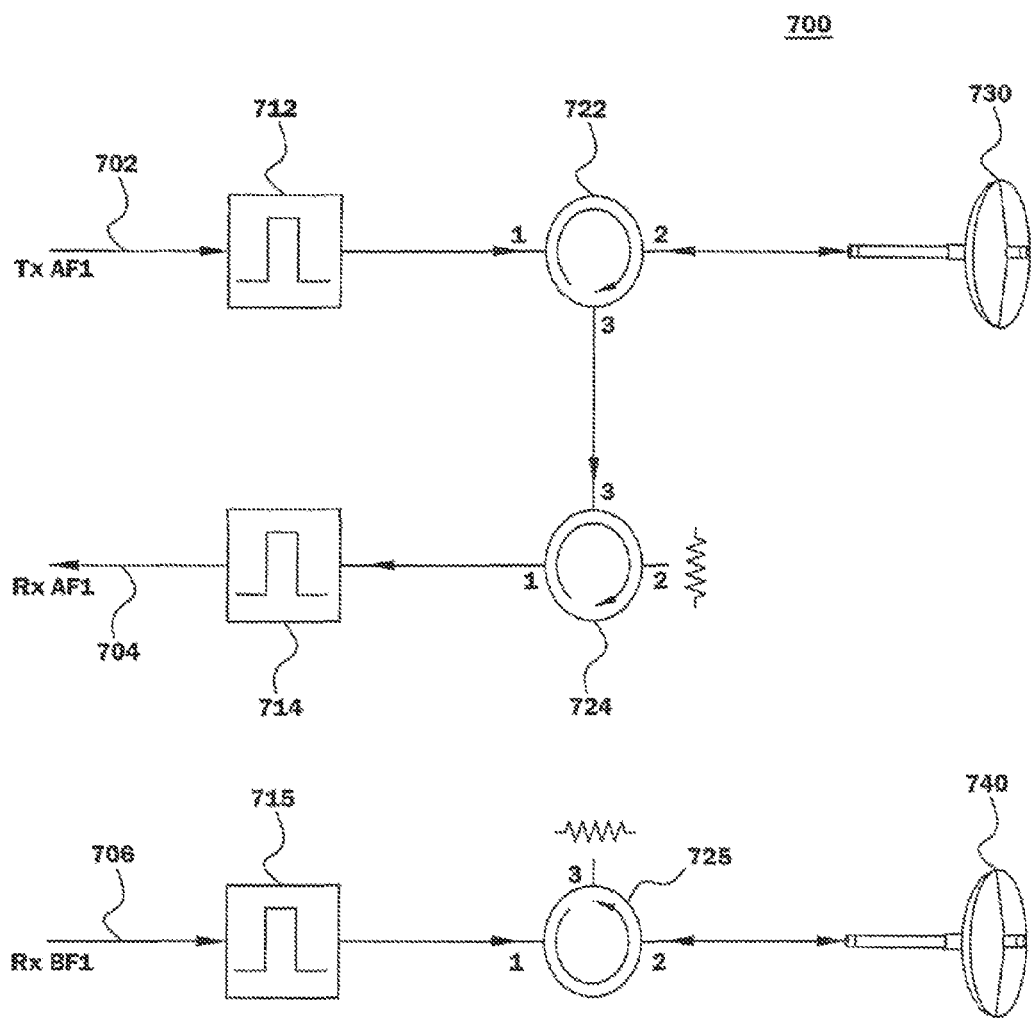

With reference to FIG. 7. a Non-protected Tx, Space Diversity Rx (Tx/Rx, Rx) antenna coupling unit configuration 700 Is illustrated. The configuration may comprise one non-protected transmitter branch 702 having a corresponding transmit filter 712 connected to a circulator 722. The configuration may further comprise two space diversity receiver branches 704, 705 having corresponding receive filters 714, 715 connected to circulator 724, 725 wherein the circulators 714, 724, 725 route the appropriate signals to/from the appropriate antennas 730, 740.

Figure 8:
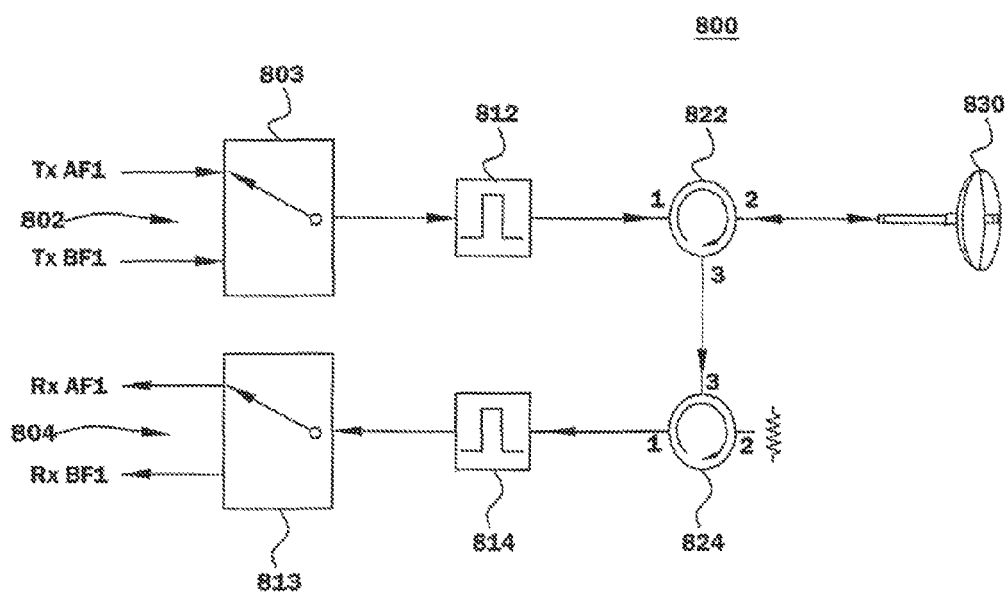

With reference to FIG. 8, a Hot Standby Protected Txs and Rxs (Tx/Rx) antenna coupling unit configuration 800 is illustrated. The configuration may comprise one protected transmitter branch 802 having a selective switch 803 adaptable to select between transmit path AF1 and BF1, a corresponding transmit filter 812 connected to a circulator 822. The configuration may further comprise one protected receiver branch 804 having a selective switch 813 adaptable to select between receiver path AF1 and BF1, a corresponding receive filter 814 connected, to a circulator 824 wherein the circulators 814, 824 route the appropriate signals to/from an antenna 830.

Figure 9:
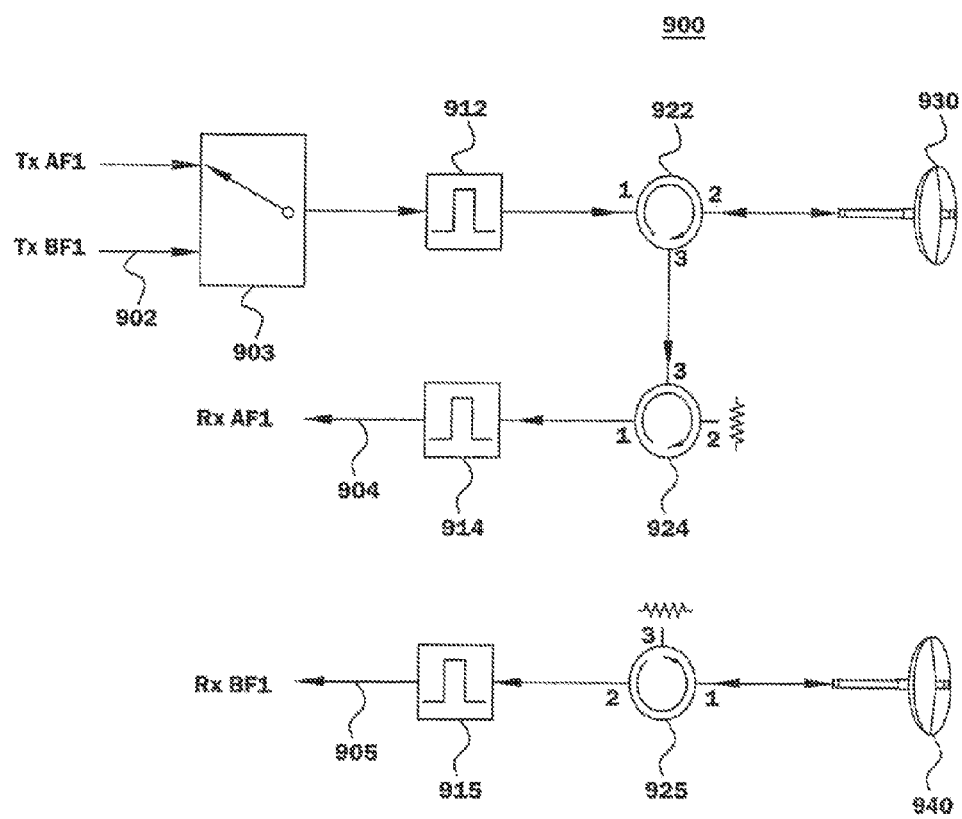

With reference to FIG. 9, a Hot Standby Protected Txs, Space Diversity Rxs (Tx/Rx, Rx) antenna, coupling unit configuration 900 is illustrated. The configuration may comprise one protected transmitter branch 902 having a selective switch 903 adaptable to select between transmit path AF1 and BF1, a corresponding transmit filter 912 connected to a circulator 922. The configuration may further comprise two space diversity receiver branches 904, 905 each having corresponding receive filters 914, 915 connected to respective circulators 924, 925 wherein the circulators 922, 924, 925 route the appropriate signals to/from antenna 930, 940.

Figure 10:
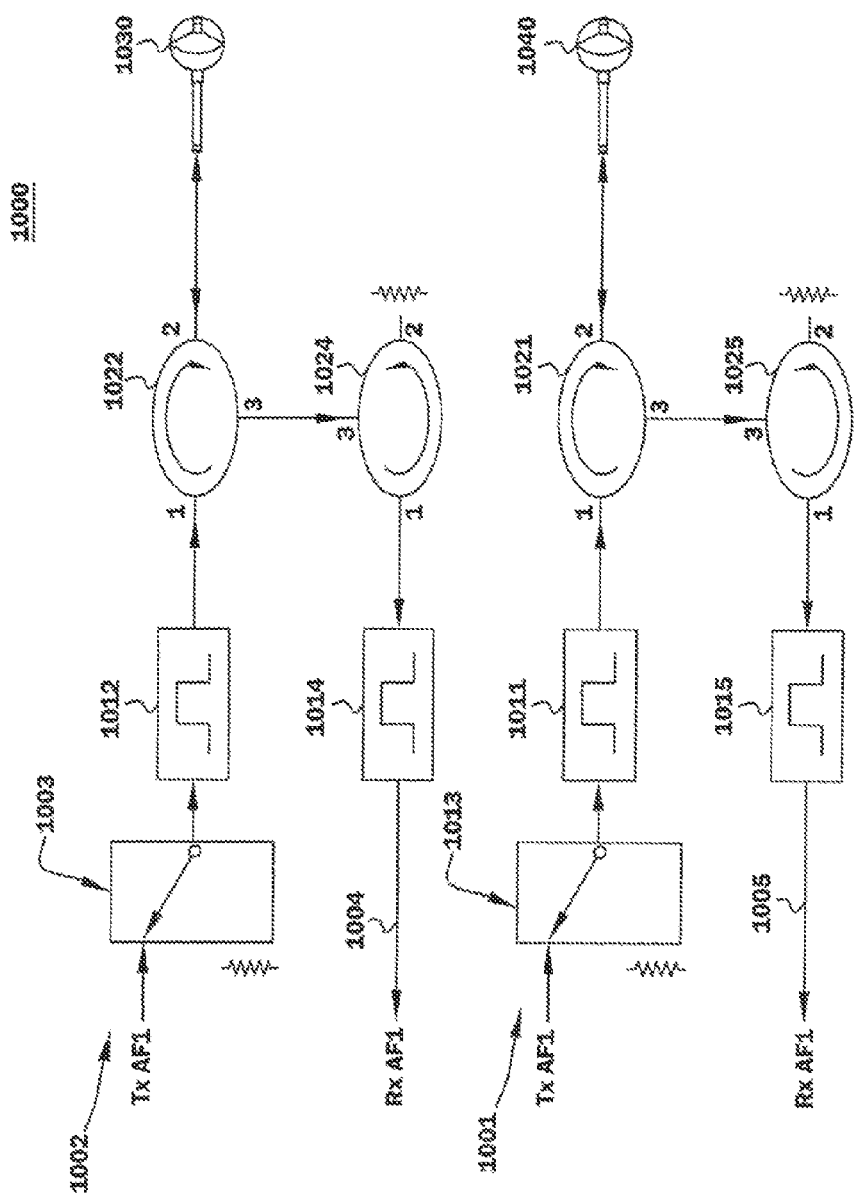

With reference to FIG. 10, a Hot Standby Protected Split Txs and Diversity Rxs (Tx/Rx, Tx/Rx) antenna coupling unit configuration 1000 is illustrated. The configuration may comprise two protected, split transmitter branches 1001, 1002 each having a selective switch 1003, 1013 adaptable to select between the respective transmit path AF1, each branch also having a corresponding transmit filter 101.1, 1012 connected to a circulator 1021, 1022. The configuration may further comprise two space diversity receiver branches 1004, 1005, each having corresponding receive filters 1014, 1015 connected to respective circulators 1024, 1025 wherein the circulators 1021, 1022, 1024, 1025 route the appropriate signals to/from antennas 1030, 1040.

Figure 11:
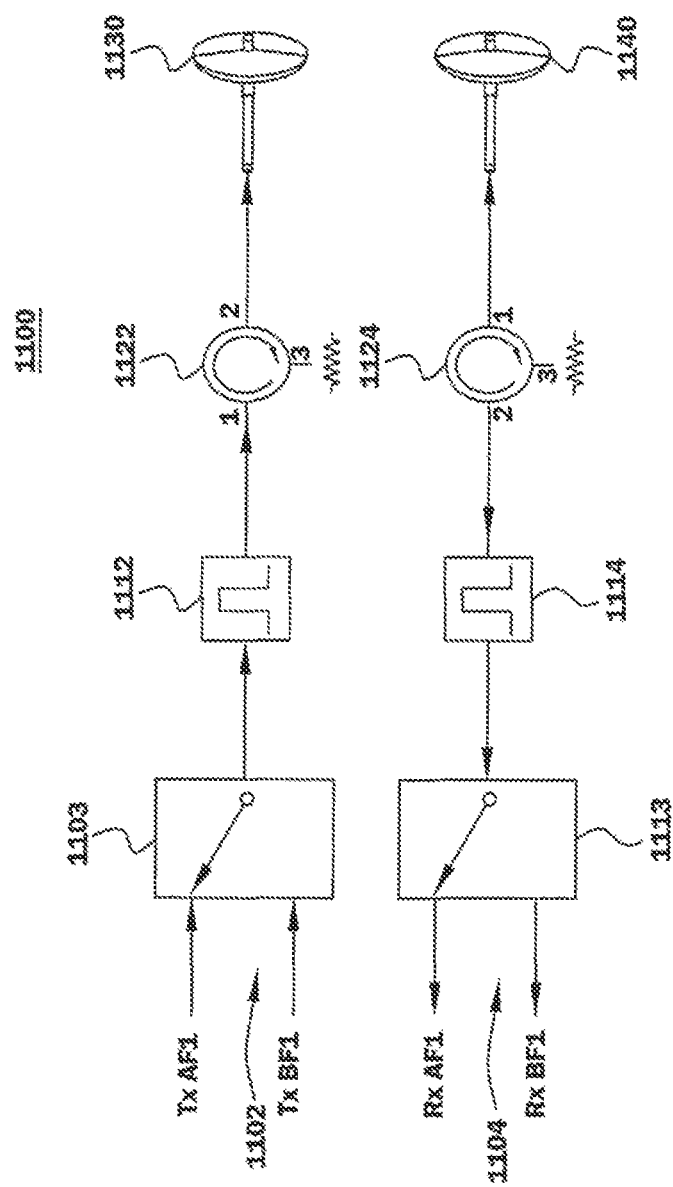

With reference to FIG. 11, a Hot Standby, Separate Tx and Rx Antennas (Tx/Rx, Rx/Rx) antenna coupling unit configuration 1100 is illustrated. The configuration may comprise one protected transmitter branch 1102 having a selective switch 1103 adaptable to select between fee transmit paths AF1 and BF1, a corresponding transmit filter 1112 connected to a circulator 1122. The configuration may further comprise a separate protected receiver branch 1104 having a selective switch 1113 adaptable to select between, the receive paths AF1 and BF1, a corresponding receive filter 1114 connected to a respective circulator 1124 wherein the circulators 1122, 1124 route the appropriate signals to/from antennas 1130, 1140.

Figure 12:
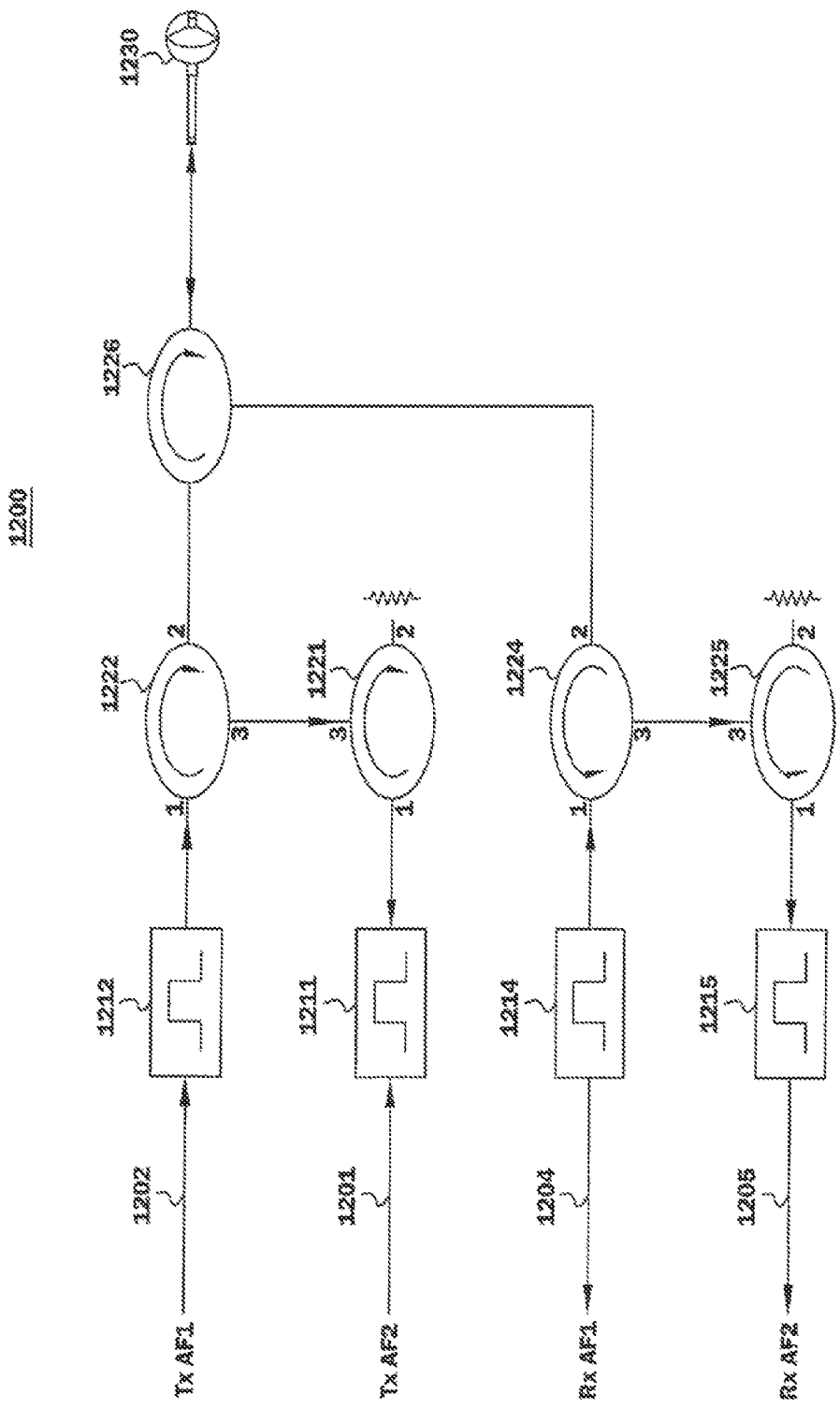

With reference to FIG. 12, a Frequency Diversity Txs and Rxs, Single Antenna (Tx/Tx/Rx/Rx) antenna coupling unit configuration 1200 is illustrated. The configuration may comprise two frequency diversity transmitter branches 1201, 1202 each having a having a corresponding transmit filter 1211, 1212 and each connected to a circulator 1221, 1222 for routing from the appropriate transmit path AF1 and/or AF2. The configuration may further comprise two frequency diversity receiver branches 1204, 1205 each having a corresponding receive filter 1214, 1215 connected to respective circulators 1224, 1225 for routing to the appropriate receive path AFI and/or AF2. An additional circulator 1226 may be connected to the transmit and receive circulators for routing signals to/from the antenna 1230.

Figure 13:
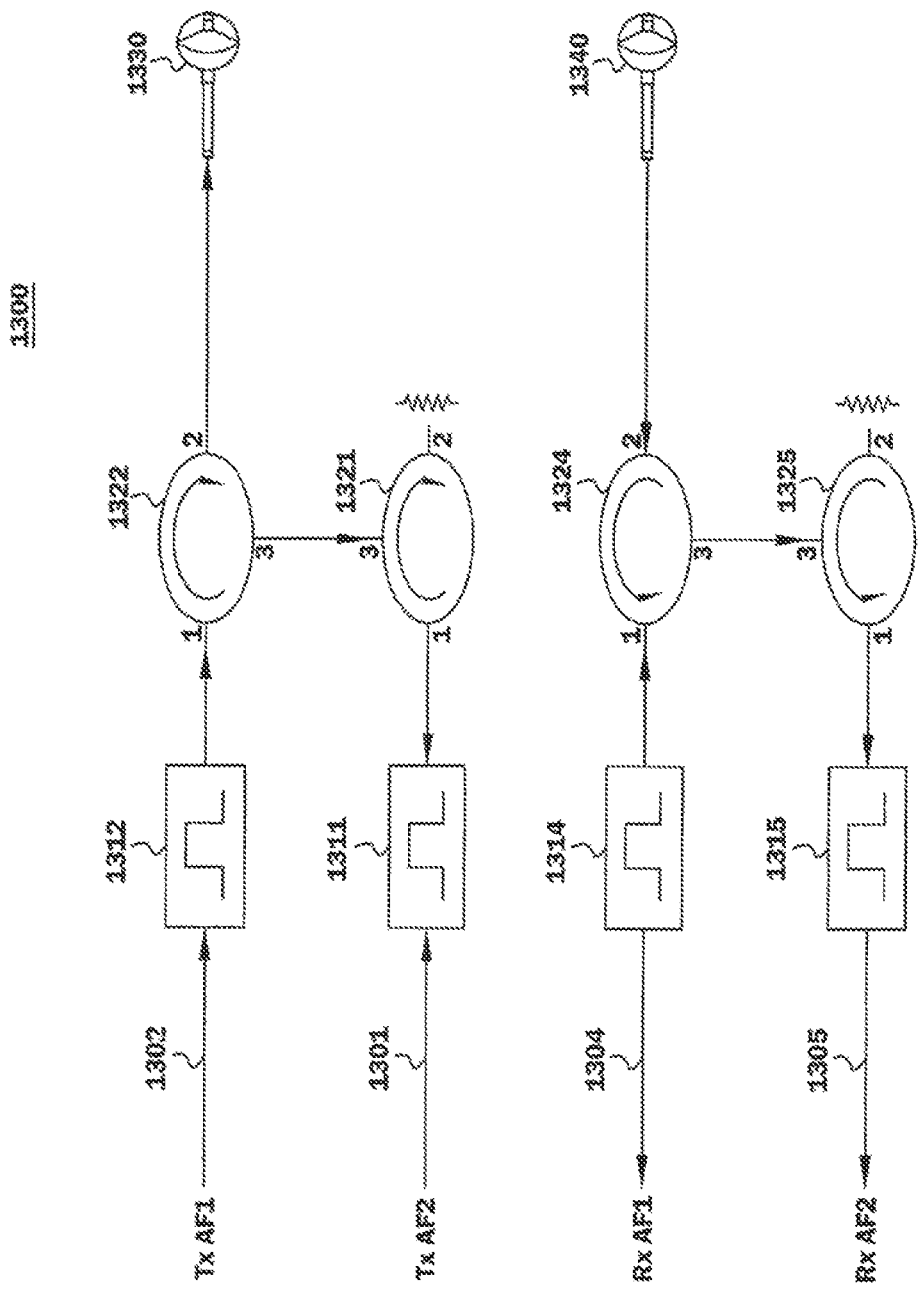

With reference to FIG. 13, a Frequency Diversity Txs and Rxs, Dual Antenna (Tx/Tx, Ex/Rx) antenna coupling unit configuration 1300 is illustrated. The configuration may comprise two frequency diversity transmitter branches 1301, 1302 each having a having a corresponding transmit filter 1311, 1312 and each connected to a circulator 1321, 1322 for routing signals from the appropriate transmit path AF1 and/or AF2 to the antenna 1330. The configuration may further comprise two frequency diversity receiver branches 1304, 1305 each having a corresponding receive filter 1314, 1315 connected to respective circulators 1324, 1325 for routing signals to the appropriate receive path AF1 and/or AF2 and from the antenna 1340.

Figure 14:
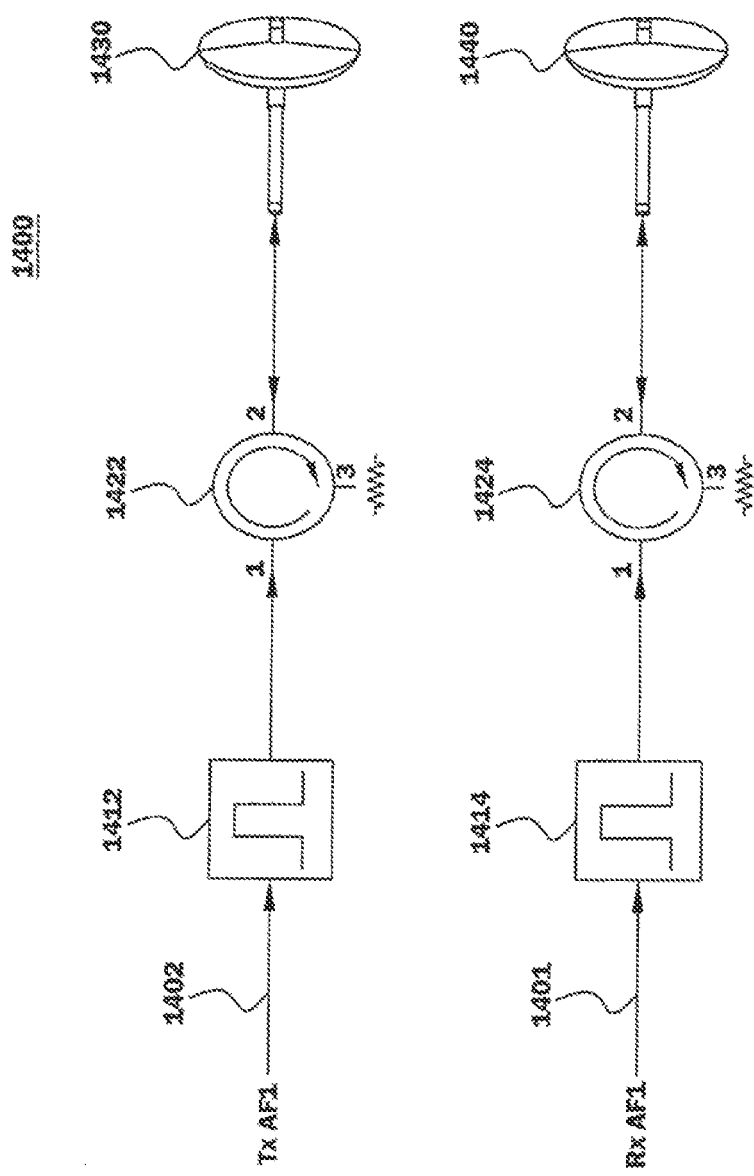

With reference to FIG. 14, a Non-protected Tx and Rx, Separate Antenna (Tx, Rx) antenna coupling unit configuration 1400 is illustrated. The configuration may comprise one non-protected transmitter branch 1402 having a corresponding transmit filter 1412 connected to a circulator 1422 for routing signals to the antenna 1430. The configuration may further comprise one non-protected receiver branch 1404 having a corresponding receive filter 1414 connected to a circulator 1424 for routing signals from the antenna 1440.

Figure 15:
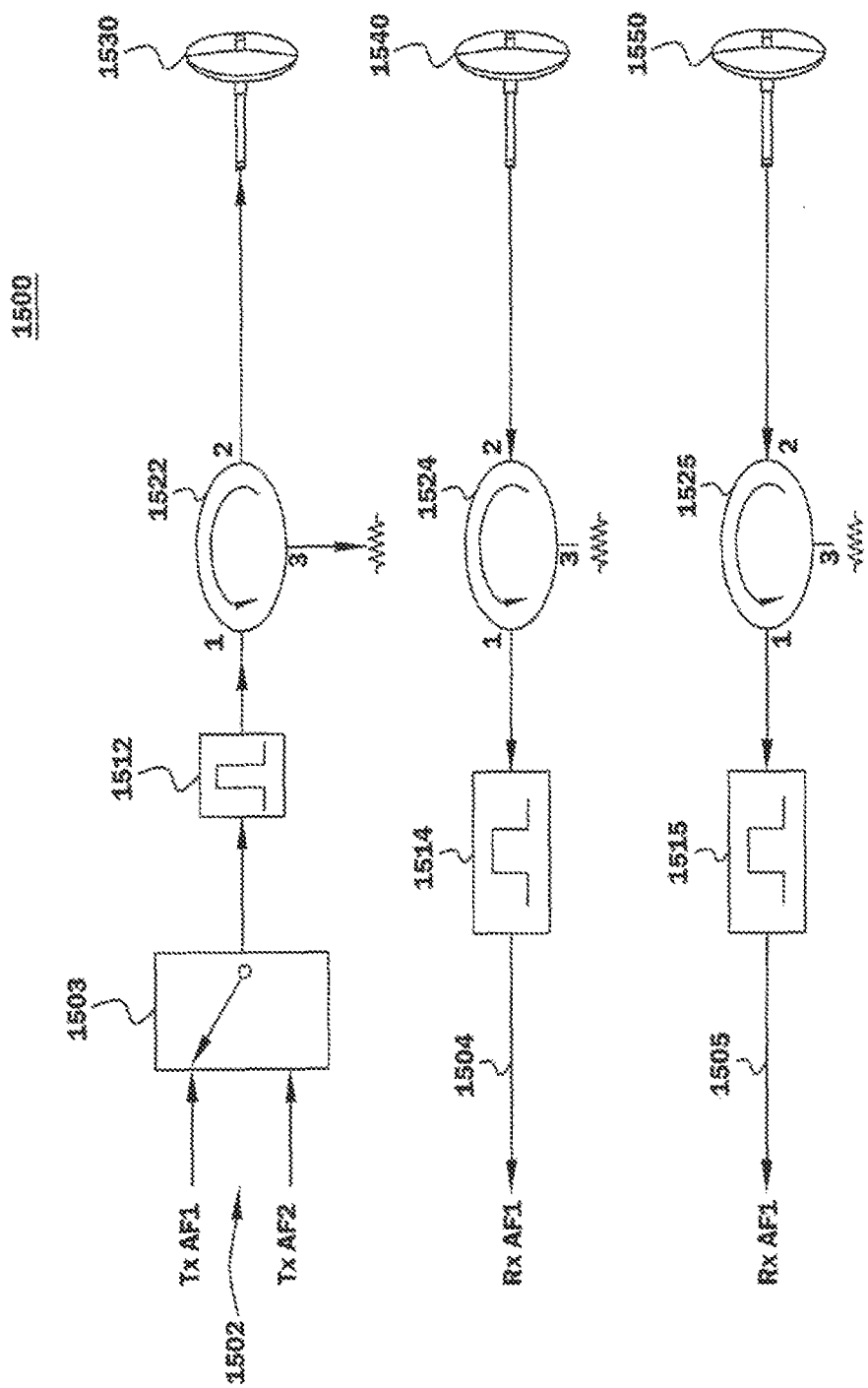

With reference to FIG. 15, a Hot Standby Protected Txs; Space Diversity Rxs, Three Antennas (Tx, Rx, Rx) antenna coupling unit configuration 1500 is illustrated. The configuration may comprise one protected transmitter branch 1502 having a selective switch 1503 adaptable to select between the transmit paths AF1 and AF2 and having a corresponding transmit filter 1512 connected to a circulator 1522 for routing signals to the antenna 1530. The configuration may further comprise two space diversity receiver branches 1504, 1505 each having a corresponding receive filter 1514, 1515 connected to respective circulators 1524, 1525 for routing signals from respective antennas 1540, 1550.

Figure 16:
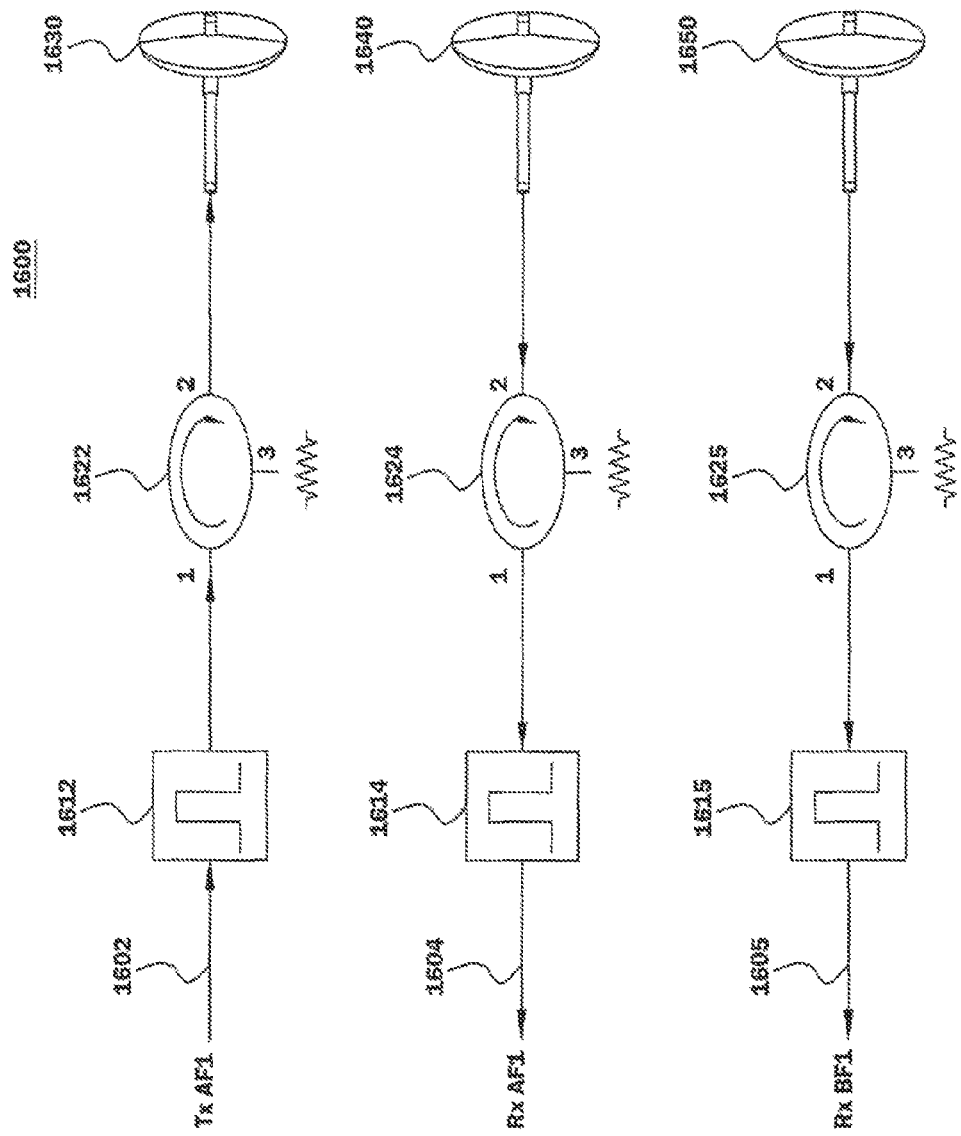

With reference to FIG. 16, a Non-Protected Tx, Space Diversity Rxs, Three Antennas (Tx, Rx, Rx) antenna coupling unit configuration 1600 is illustrated. The configuration may comprise one non-protected transmitter branch 1602 having a corresponding transmit filter 1612 connected to a circulator 1622 for routing signals to the antenna 1630. The configuration may further comprise two space diversity receiver branches 1604, 1605 each having a corresponding receive filter 1614, 1615 connected to respective circulators 1624, 1625 for routing signals from respective antennas 1640, 1650.

Figure 17:
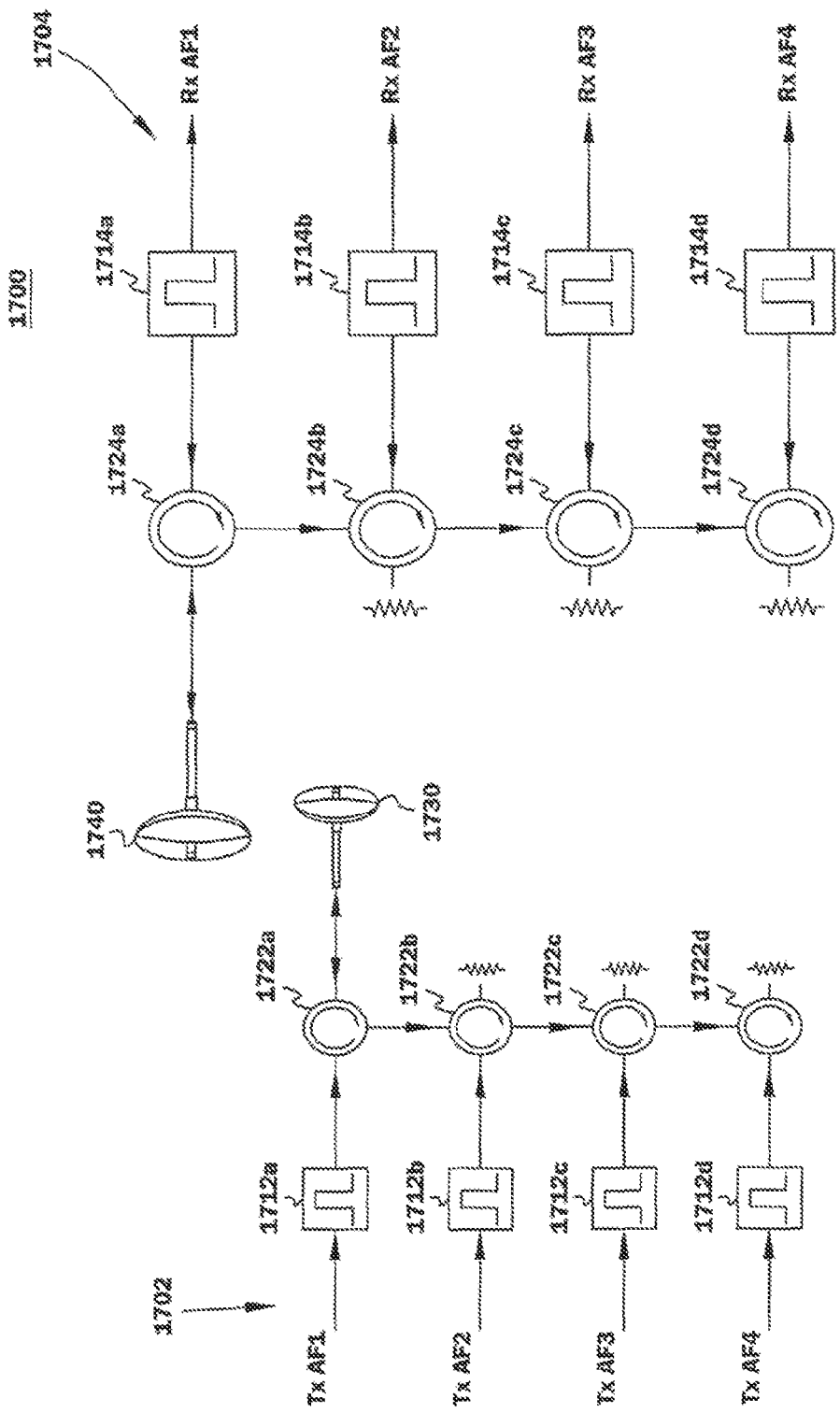

With reference to FIG. 17, a 1:3 Frequency Diversity Txs (Txs, Rxs) antenna coupling unit configuration 1700 is illustrated. The configuration may comprise a 1:3 frequency diversity transmitter branch 1702 having four transmit paths AF1-AF4, four corresponding transmit filters 1712*a-d*, each connected to respective circulators 1722*a-d* for routing signals to the antenna 1730. The configuration may further comprise a 1:3 frequency diversity receiver branch 1704 having four receive paths AF1-AF4, four corresponding receive filters 1714*a-d*, each connected to respective circulators 1724*a-d* for routing signals from the antenna 1740.

Figure 18:
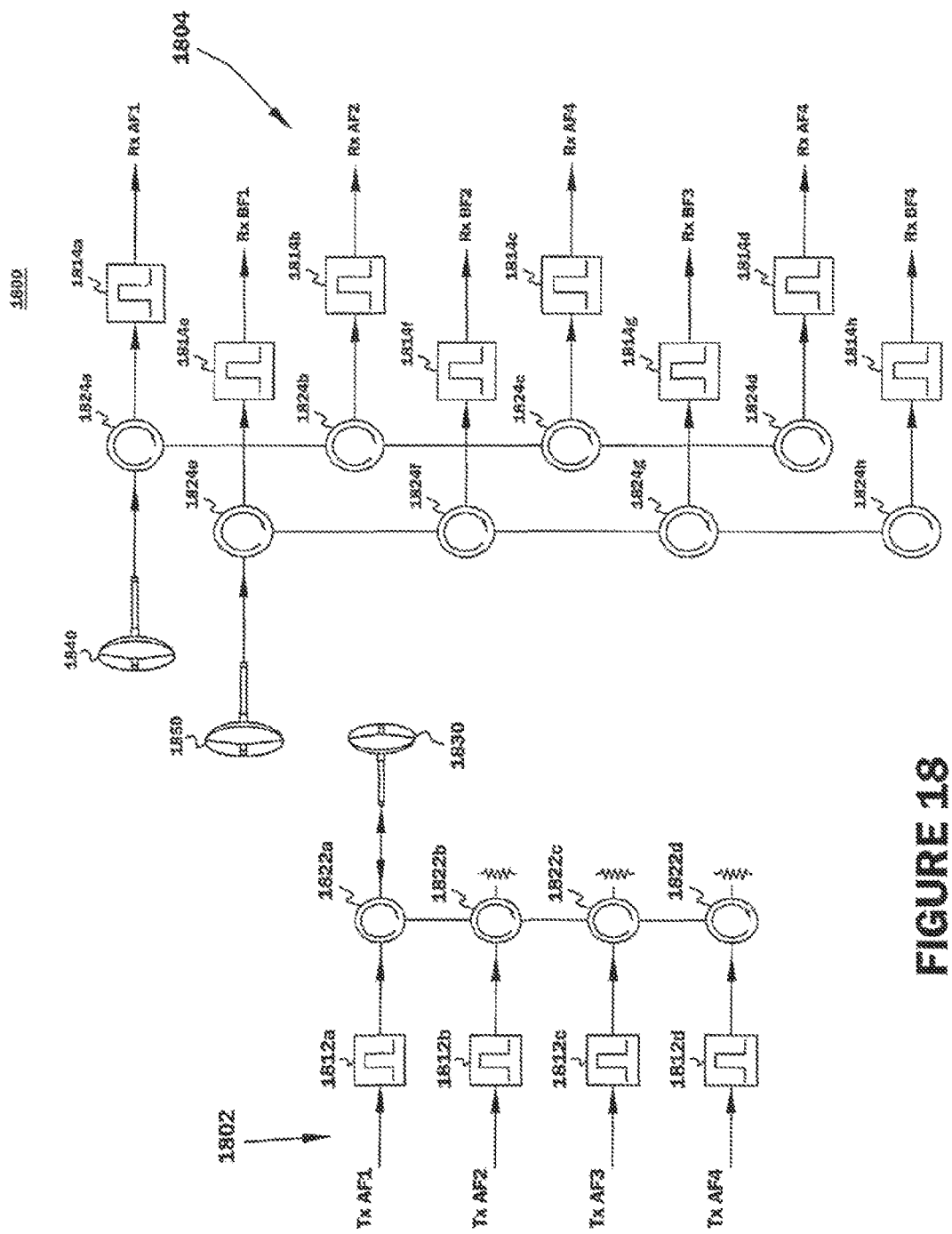

With reference to FIG. 18, a 1:3 Frequency Diversity Txs, Space Diversity Rxs, Three Antennas (Txs, Rxs, Rxs) antenna coupling unit configuration 1800 is illustrated. The configuration may comprise a 1:3 frequency diversity transmitter branch 1802 having four transmit paths AF1-AF4, four corresponding transmit filters 1812*a-d*, each connected to respective circulators 1822*a-d* for routing signals to the antenna 1830. The configuration may further comprise a 1:3 space diversity receiver branch 1804 having eight receive paths AF1-AF4 and BF1-BF4, eight corresponding receive filters 1814*a-h*, each connected to respective circulators 1824*a-h* for routing signals from the respective antennas 1840, 1850.

The above circulators may be any commonly utilized circulator in the industry for millimeter wave and/or microwave communications systems. Exemplary circulators may be, but are not limited to 3-port "turnstile" or "Y-junction" circulators and may be of the compact stripline variety. Additionally, the above filters may be any commonly utilized filters in the industry for millimeter wave and/or microwave communications systems.

The receiver aspects of embodiments of the present subject matter are described in further detail in related U.S. application Ser. No. 11/750,209, filed May 17, 2007, entitled "Compact Dual Receiver Architecture For Point To Point Radio," the entirety of which is incorporated herein by reference. The transmitter aspects of embodiments of the present subject matter will be further described herein.

Figure 19A:
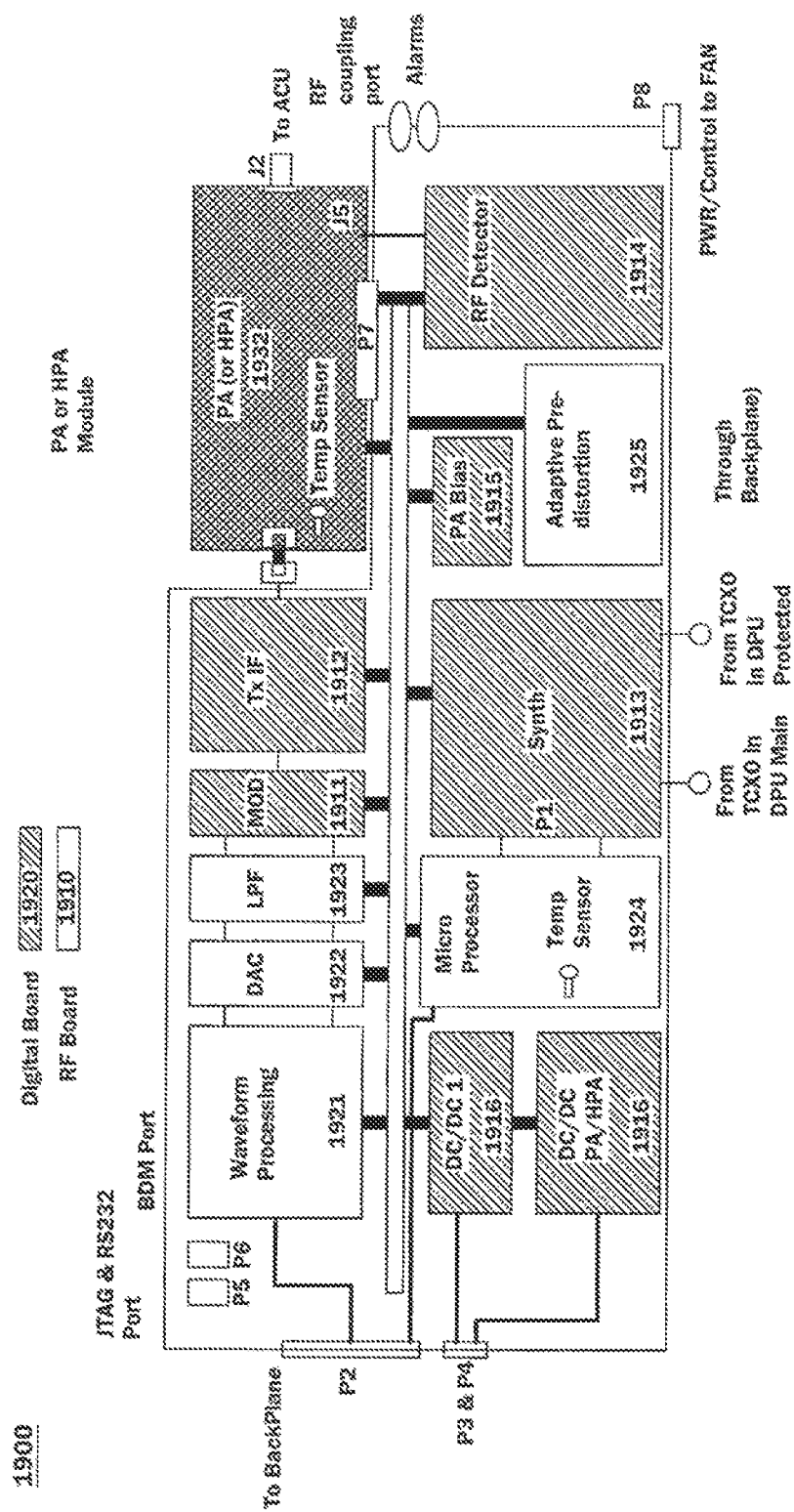
FIG. 19A is a block diagram of a transmitter according to one embodiment of the present subject matter.
Figure 19B:
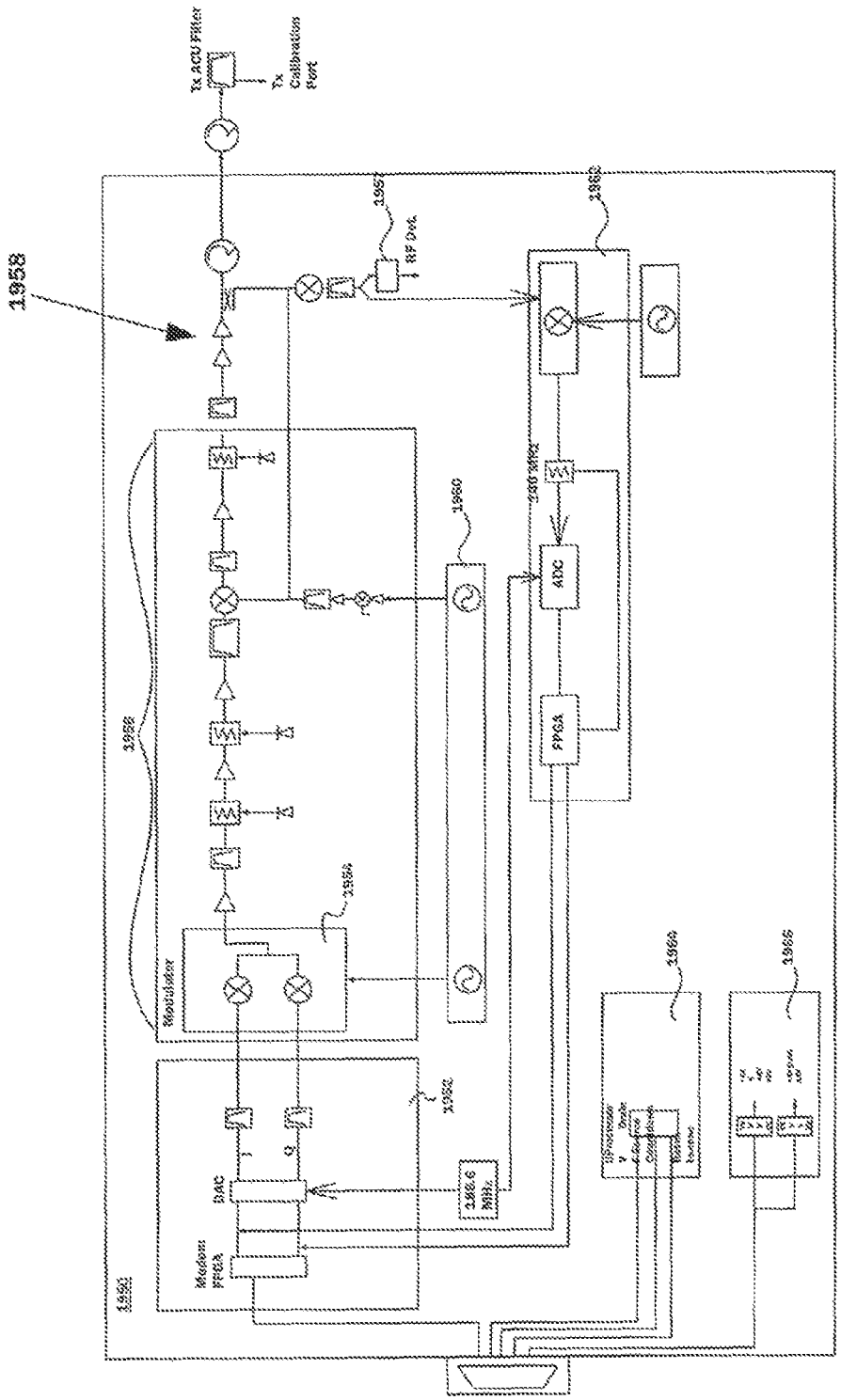
FIG. 19B is a diagram of a transmitter according to another embodiment of the present subject matter.

FIG. 19A is a block diagram of a transmitter according to one embodiment of the present subject matter. With reference to FIG. 19A, a transmitter 1900 may generally comprise of three modules or boards, an RF board 1910, a digital board 1920 and a Power Amplifier ("PA") (or High Power Amplifier ("HPA")) board 1930. The RF board 1910 may generally comprise a modulator 1911, Tx IF upconverter 1912 and synthesizer circuitry 1913, PA bias circuitry 1915, RF detector circuitry 1914 having a Tx temperature sensor, RF feedback for adaptive pre-distortion circuitry 1925 and DC/DC converter circuitry 1916. The PA and/or HPA and/or LP A board 1930 ("LPA/PA/HPA") may generally comprise its respective bias loops, an amplifier temperature sensor and power amplifiers 1932. The Digital board 1920 may generally comprise a Waveform Processing section 1921, digital-to-analog converter ("DAC") circuitry 1922, filters 1923, a microprocessor 1924, and adaptive pre-distortion circuitry 1925. FIG. 19B is a diagram of a transmitter according to another embodiment of the present subject matter. With reference to FIG. 19B, a transmitter 1950 may generally comprise a modem 1952, a modulator 1954, RF/TF circuitry 1956, a detector 1957, an LPA/PA/HPA 1958, a synthesizer 1960, adaptive pre-distortion circuitry 1962, a microprocessor 1964 and a DC/DC converter 1966. Additional aspects of the identified components of embodiments of the present subject will be discussed in further detail below.

For the purpose of minimizing power consumption, embodiments of the present subject matter may be adaptable to provide two separate wide-mouth DC/DC converters. One DC/DC converter may be utilized for general purposes such as waveform processing, RF/1F converter, synthesizer, microcontroller, adaptive pre-distortion and RF detector circuitries. The second DC/DC converter may be utilized for PA (or HPA) circuitry. Of course, both DC/DC converters may possess an equivalent shutdown pin.

Figure 20:
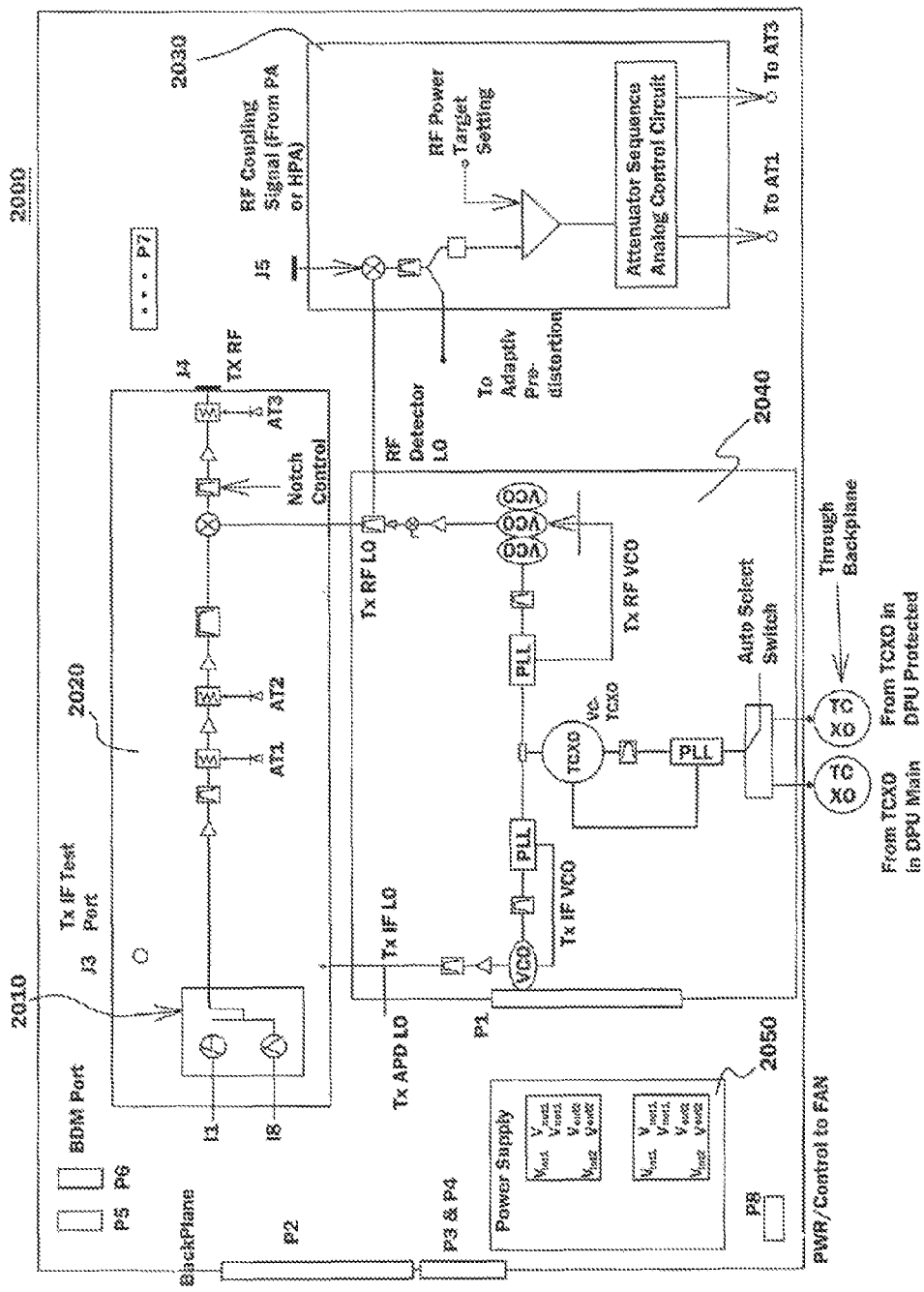
FIG. 20 is a diagram of an RF board according to an embodiment of the present subject matter.

FIG. 20 is a diagram of an RF board according to an embodiment of the present subject matter. With reference to FIG. 20, an RF board 2000 comprises a modulator 2010, a Tx IF section 2020, an RF/IF detector section 2030, a synthesizer section 2040, a DC/DC converter section 2050 and biasing circuitry (not shown) for the LPA/PA/HPA module or hoard 1930. While biasing circuitry may be a portion of the LPA/PA/HPA module 1930, alternative embodiments may provide non-critical supporting bias circuitry as a part of Tx IF/RF upconverter circuitry. Such supporting biasing circuitry may include bias sequence, bias control, bias detecting and thermal management to the LPA/PA/HPA module 1930.

Figure 21:
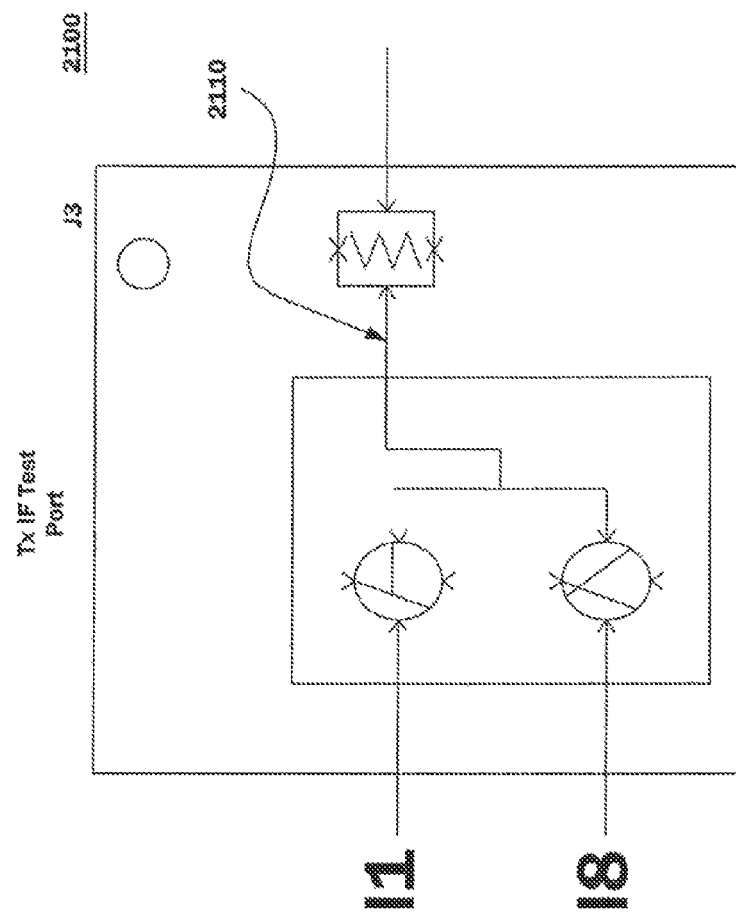
FIG. 21 is a diagram of a modulator section according to an embodiment of the present subject matter.

FIG. 21 is a diagram of a modulator section according to an embodiment of the present subject matter. With reference to FIG. 21, the modulator section 2100 may receive a plurality of signals I1, 18, select a signal and provide a modulated Tx IF signal 2110 to the Tx IF section 2020. Table 3 below provides a listing of modulator section 2000 specifications according to one embodiment of the present subject matter; however, such a listing should not in any way limit the scope of the claims appended herewith.

TABLE 3

| | |
|---|---|
| Baud Rate | 3-35 MBaud |
| EVM-RMS, <15 MBaud | 1.5 deg. Max |
| EVM-Peak, <15 MBaud | 4 deg. Max |
| EVM-RMS, >15 MBaud | 3 deg. Max |
| EVM-Peak, >15 MBaud | 8 deg. Max |
| Modulator LO rejection | 30 dBc min |
| Sideband rejection | 30 dBc min |
| Tx IF LO input signal | 6 GHz: 1848.5 MHz +/− 0.5 MHz |
| | 7/8 GHz: 2260 MHz +/− 0.5 MHz |
| | 10/11 GHz: 2498.5 MHz +/− 0.5 MHz |
| Tx IF LO input level | −3 dBm +/− 3 dB |
| Tx IF Spurious | −65 dBcmax. F: +10 kHz to 10 MHz |
| | −10 kHz to 10 MHz |
| | −85 dBc max. F: +10 MHz to 100 MHz |
| | −10 MHz to −100 MHz |
| | −45 dBc max. F: +/−100 MHz and beyond |
| IF Output Noise Level | −148 dBm/Hz max. |
| Output Power | −13 Bm +/− 1 dB |

Figure 22:
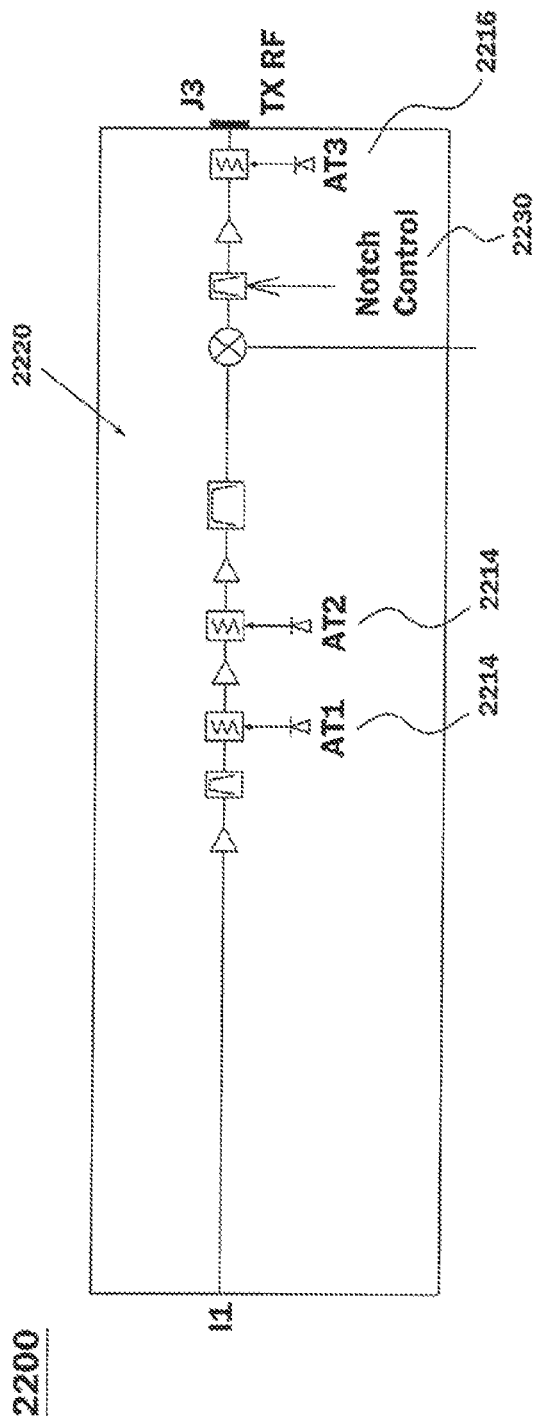
FIG. 22 is a diagram of a Tx IF section according to an embodiment of the present subject matter.

FIG. 22 is a diagram of a Tx IF section according to an embodiment of the present subject matter. With reference to FIG. 22. a Tx IF section 2200 may receive a modulated signal I1 from the modulator section 2100 and provide the modulated signal to three attenuators AT1 221.2, AT2 2214 and AT3

2216 in an RF/IF upconverter section 2220 thereof. In one embodiment, AT1 2212 and AT3 2216 may be analog attenuators and utilized for closed loop capability with the RF detector (not shown) to achieve a maximum 30 dB power control in 1 dB step sizes. In an additional embodiment; AT2 2214 may be a digital attenuator and utilized for modulation index and unit-to-unit gain compensation. For reserving non-linearity information for linearization correction, berth Tx IF and Tx RF signal bandwidth may be at least 3 times the signal bandwidth. The Tx IF section 2200 may further comprise a notch filter control line 2230 which is adaptable to turn on a PIN diode and assist, in rejecting a local oscillator ("LO") signal in certain frequency bands. Table 4 below provides a listing of Tx IF section 2200 specifications according to an embodiment of the present subject matter; however, such a listing should not in any way limit the scope of the claims appended herewith.

wide loop bandwidth synthesizer to enhance system robustness against vibrations and eliminating the need for expensive cabling and shock absorbing mounts.

Figure 23:
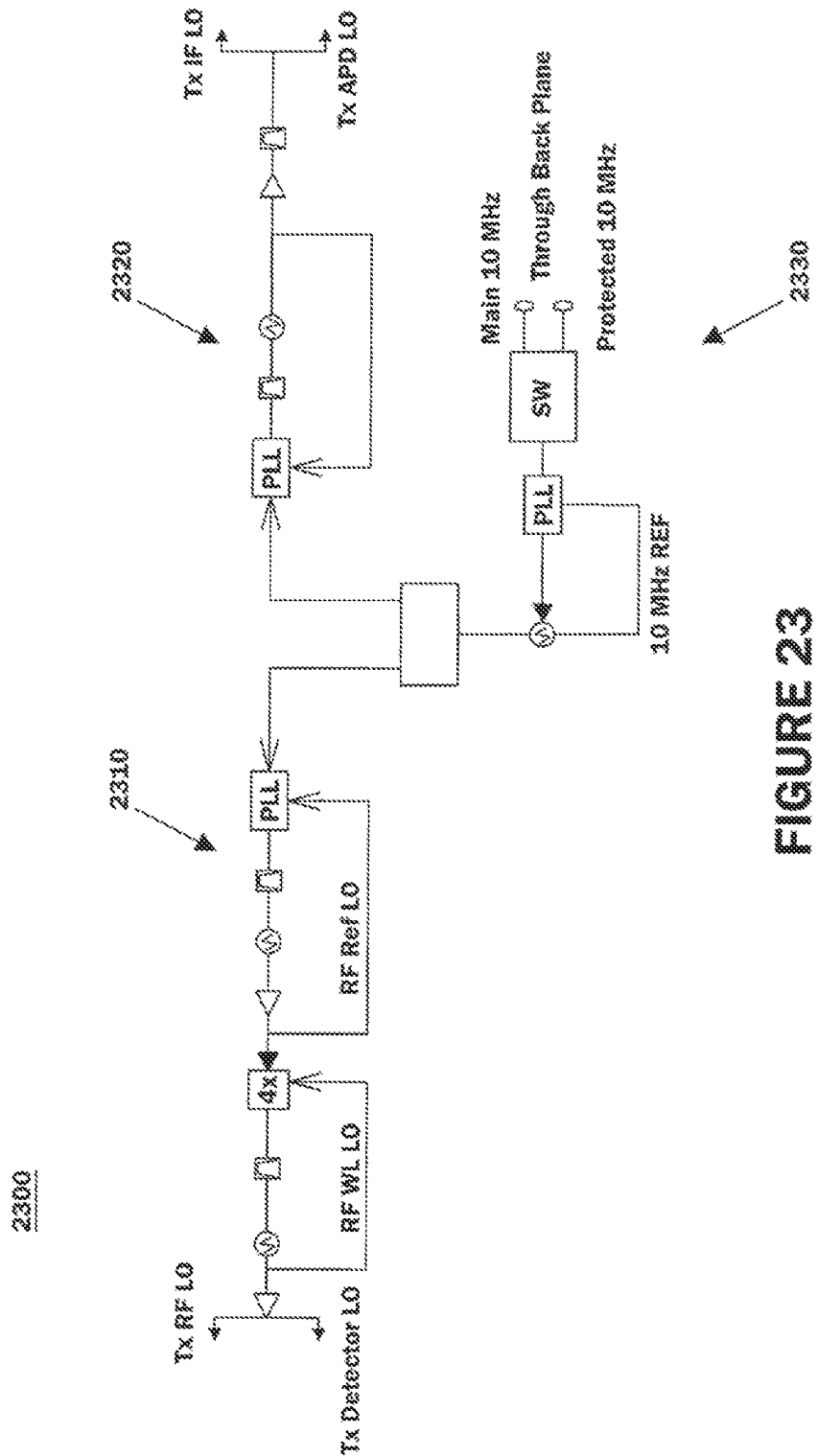
FIG. 23 is a diagram of a synthesizer section according to an embodiment of the present subject matter.

Additional embodiments of the present subject matter may employ the dual loop synthesizer architecture shown in FIG. 23. For example, the two loops in the Tx RF LO may provide one loop having approximately an approximately 15 kHz loop bandwidth to supply adequate system phase noise and a second loop having approximately 1 MHz loop bandwidth to absorb any potential phase hits caused by components, mechanical vibrations, temperature variations and/or material stress, etc. In comparison to a conventional single loop approach, the dual loop architecture may provide a significant improvement regarding susceptibility for phase-hits and micro-phonics. However, embodiments of the present subject matter may employ various synthesizer architectures and the

TABLE 4

| | |
|---|---|
| Tx RF output power range | 0 dBm max. |
| Tx Mute | 70 dBc min with setting AT1, AT2 and AT 3 at maximum attenuation with proper PA bias setting |
| AT1 attenuation range | 25 dB min. |
| AT2 attenuation range | 31 dB (5 bits) |
| AT3 attenuation range | 34 dB min. |
| Tx IF filter options | 0.5 dBc max@Fc +/− 20 MHz<br>Filter: 1 dB BW = 100 MHz<br>Rejection: 15 dB min. @100 MHz offset |
| IM3 | −52 dBc min. with adaptive on<br>−57 dBc min. with adaptive off<br>(with AT2 = 4 dB and adjusting AT3 until Pout = 0 dBm) |
| Noise Figure | 30 dB max with AT2 = 4 dB and adjusting AT3 until Pout = Bm |
| Gain | 18 dB minimum and 26 dB maximum when all attenuators at 0 dB attenuation |
| Stability | Unconditional stable |
| Spurious @0 dBm output | −50 dBc max F: +10 kHz to 25 kHz<br>−10 kHz to −25 kHz<br>−65 dBcmax. F: +25 kHz to 10 MHz<br>−25 kHz to −10 MHz<br>−85 dBc max. F: +10 MHz to 100 MHz<br>−10 MHz to −100 MHz<br>−45 dBc max, F: +/−100 MHz and beyond |
| Tx RF in-band flatness | +/−0.5 dB max within any +/−20 MHz bandwidth<br>+/−1dB max within +/−50 MHz bandwidth depending on filter option |
| DC suppliers | +5 V/160 mA<br>−5 V/20 mA<br>+12 V/50 mA |

FIG. 23 is a diagram of a synthesizer section according to an embodiment of the present subject matter. With reference to FIG. 23, the synthesizer section 2300 is a portion of the RF board and may comprise two synthesizers, Tx IF LO 2310 and Tx RF LO 2320, having a shared reference. A local reference 2330 (e.g., a voltage controlled-temperature compensated crystal oscillator ("VC-TCXO")) may also be phase locked with another common TCXO reference in a data processing unit ("DPU") (not shown) through the backplane. This locking may occur or be triggered as a function of an alarm. The TXCO reference may be a common reference for all transmitters and receivers within an entire radio shelf. For certain frequency bands, because of the bandwidth requirement, there may be a need to utilize multiple RF voltage controlled oscillators (VCO) to cover the entire bandwidth. Thus, embodiments of the present subject matter may provide a transmitter architecture utilizing a combination of the coarse tune of the RF LO and/or the tine tune of a numerically controlled oscillator ("NCO") in an FPGA (not shown). Since the NCO may be a digital programmable oscillator, the phase noise requirement may be reduced thus allowing usage of a examples provided above should in no way limit the scope of the claims appended herewith.

For protection purposes, there may also be another protection DPU. For hitless purposes, when changing references from the main DPU to the protected DPU, there will not be any error or synchronization losses during switching. Protection switching aspects of embodiments of the present matter are described in co-pending and related U.S. application Ser. No. 11/655,837, filed Jan. 22, 2007, entitled Distribution Protection Switching Architecture for Point-to-Point Microwave Radio Systems, the entirety of which is incorporated herein by reference. Thus, this architecture provides a coherent and hitless transmitter architecture by providing two common references from the DPUs that go through the backplane to the transmitter modules. All the sources within the same receiver may share this common reference and all of the transmitters within the same shelf may also share this reference. In addition to a common reference for all the sources and all transmitters, such an architecture may also provide a hitless switching capability when one reference fails and is switched to the second reference. The common reference also provides the capability of future multiple input multiple output ("MIMO") and transmitter coherent features. For example, a DPU may further comprise plural switches adaptable to switch from a first of plural transmitters in a radio shelf to a second of the plural transmitters in the shelf. The switching may occur as a result of an error or failure in the first transmitter or may occur as a function of a quality measurement of the RF signal. Exemplary quality measurements may be, but are not limited to, signal strength, SNR, bit error rate, received power level and the like. Table 5 below provides a listing of Tx Synthesizer specifications according to one embodiment of the present subject matter; however, such a listing should not in any way limit the scope of the claims appended herewith.

TABLE 5

| | |
|---|---|
| Tx IF LO step size | 5 kHz for 6/7/8 GHz |
| | 125 kHz for 10/11 GHz |
| Tx IF LO Timing Bandwidth | +/−0.5 MHz |
| Tx IF LO phase noise | −100 dBc/Hz @ 10K offset |
| Tx RF Ref. LO Frequency | 6 GHz: 969-1320 MHz |
| Range | 7/8 GHz: 1212-1560 MHz |
| | 10/11 GHz: 2000.375-2300.375 MHz |
| Tx RF Ref. Divide Ratio | 6 GHz: 4 |
| | 7/8 GHz: 4 |
| | 10/11 GHz: 4 |
| Tx RF Ref. LO step size | 6 GHz: 250 kHz |
| | 7/8 GHz: 250 kHz |
| | 10/11 GHz: 250 kHz |
| Tx RF Ref. LO phase noise | 6 GHz: −102 dBc/Hz @10K offset |
| | 7/8 GHz: −102 dBc/Hz @10K offset |
| | 10/11 GHz: −106 dBc/Hz @10K offset |
| Tx RF Ref. LO step size | 6 GHz: 1 MHz |
| | 7/8 GHz: 1 MHz |
| | 10/11 GHz: 1 MHz |
| Tx RF LO phase noise (SSB) with total multiplification factor | IPN 25 KHz to 1 MHz: −41 dBc/0.48 deg. (32QAM) |
| | IPN 75 KHz-to 5 MHz: −44.44 dBc/0.34 deg. (64QAM) |
| | IPN 40 KHz to 2 MHz: −47.61 dBc/0.24 deg. (128QAM) |
| | IPN 250 KHz to 10 MHz: −50.49 dBc/0.17 deg. (256QAM) |
| Tx IF LO harmonics | −35 dBc min. |
| Tx RF LO harmonics | −35 dBc min. |
| Tx RF LO Spurious | −50 Bc max. F: +10 kHz to 25 kHz |
| | −10 kHz to−25 kHz |
| | −65 dBc max. F: +25 kHz to 10 MHz |
| | −25 kHz to −10 MHz |
| | −90 dBc max. F: +10 MHz to 100 MHz |
| | −10 MHz to −100 MHz |
| | −45 dBc max. F: +/−100 MHz and beyond |
| Phase hit for frequency jump | 7 KHz max. |
| DC suppliers | +5 V/350 mA |
| | −5 V/20 mA |
| | +12 V/330 mA |
| Local reference | Frequency: 10 MHz |
| | Stability: +/−5 ppm including 5 years aging and temperature variation |

Figure 24:
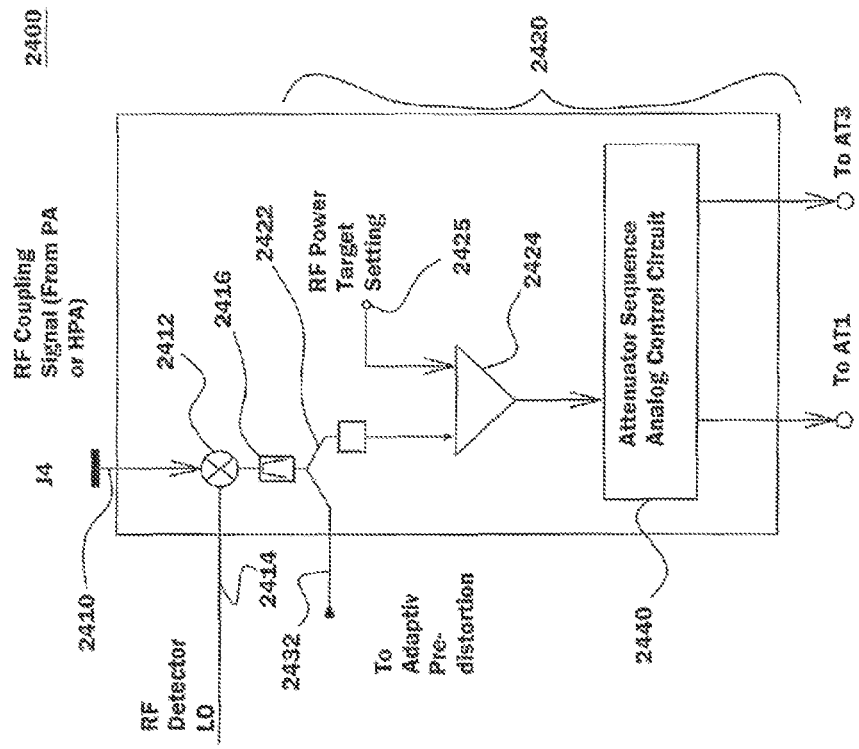
FIG. 24 is a diagram of an RF/IF detector section according to an embodiment of the present subject matter.

FIG. 24 is a diagram of an RF/IF detector section according to an embodiment of the present subject matter. With reference to FIG. 24, the RF/IF detector section 2400 accepts an RF coupling signal from the output stage of either the LPA/PA/HPA (not shown), mixes the RF coupling signal at a mixer 2412 with the Tx RF LO signal 2414 to recover the original Tx IF signal. The recovered signal may then be passed through a band-pass filter 2416 and split into two channels. A first channel 2422 is provided to RF power detecting circuitry 2420 and a second channel 2430 is provided to the adaptive pre-distortion circuitry (not shown). In the RF power detecting circuitry 2420, a comparator 2424 may be provided that compares the first channel 2422 with, a comparison reference signal 2425 set by a microcontroller (not shown). The compared signal may then be provided through analog sequence circuitry 2440 to generate an analog voltage having an appropriate sequence for closed loop capabilities with AT1 2212 and AT3 2216 to achieve a total 30 dB power output level control in 1 dB steps in conjunction with a standard LPA/PA/HPA module. The RF/IF detector section 2400 may also include a temperature sensor (not shown). This temperature sensor may provide an overall transmitter temperature sensor for the transmitter to thereby provide for fan control, temperature correction if necessary, and act as the main current transmitter temperature display.

It is thus an aspect of embodiments of the present subject matter to provide an accurate high dynamic range output power control. For example, prior art radios generally utilize a limited range RF detector approach or an approach having no false alarm and open loop calibration. Certain embodiments of the present subject matter may employ a mixing down RF/IF detector approach that is capable of supporting an accurate wider dynamic range with true power detection without temperature, modulation, and capacity correction. This mixing down detecting concept may also support both analog and digital loops and provide a full range power failure alarm and real time true power monitoring capability. In an alternative embodiment, the RF/IF detector may further include a root-mean-squared ("RMS") power detector and a variable attenuator operating on an IF signal. Table 6 below provides a listing of RF/IF Detector section specifications according to one embodiment of the present subject matter; however, such a listing should not in any way limit the scope of the claims appended herewith.

TABLE 6

| | |
|---|---|
| Tx IF (detecting signal bandwidth | BW: 100 MHz min. |
| Tx IF (detecting signal) inband flatness | +/−0.5 dB within +/−20 Hz bandwidth |
| Rejection | 15 dB min. @100 MHz offset |
| Tx IF (detecting signal) dynamic level | 45 dB min. |
| RF detector rise time | 1 ms max. |
| DC supply | 5 V/50 mA |
| | −5 V/10 mA |

Figure 25:
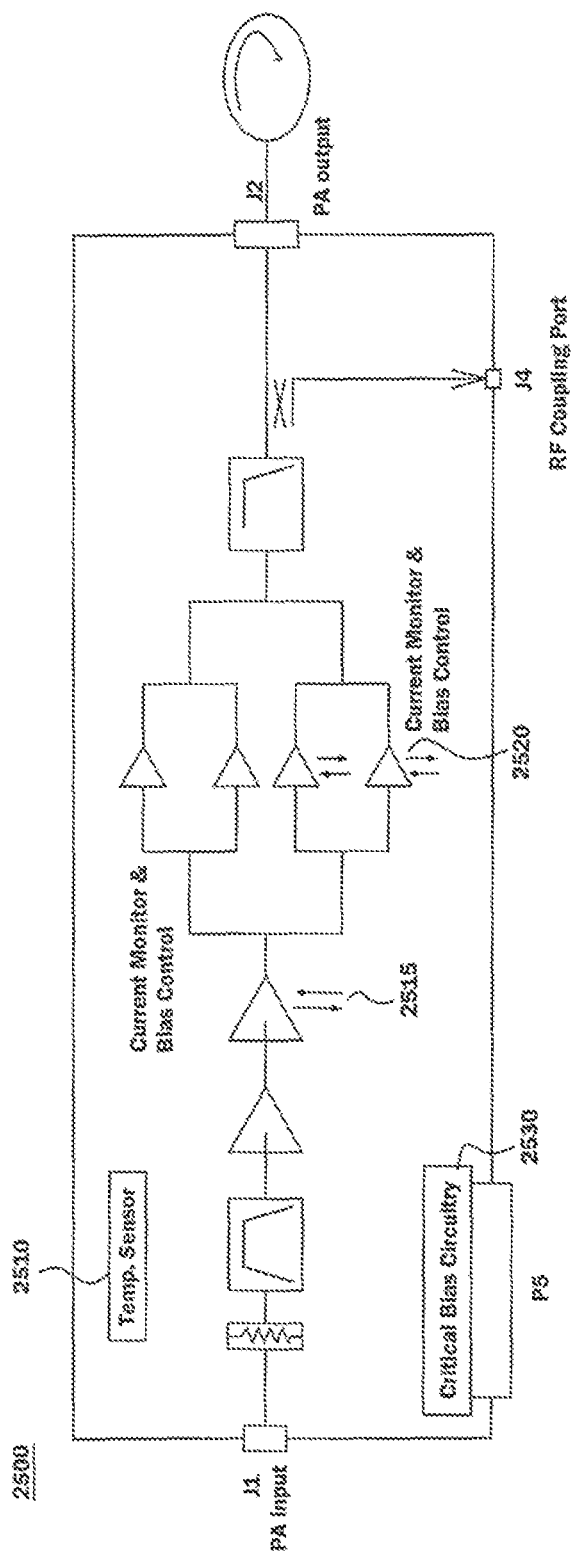
FIG. 25 is a diagram, of an Amplifier module according to an embodiment of the present subject matter.

FIG. 25 is a diagram of Amplifier module according to an embodiment of the present subject matter. With reference to FIG. 25, the Amplifier (LPA/PA/HPA) module 2500 may be provided in the same mechanical enclosure with the same controls. The module 2500 may include a temperature sensor 2510 that is adaptable to compensate for any excess temperature due to the operation of the power amplifier. The module 2500 may also provide an accurate bias control/setting if necessary and may provide power amplifier thermal monitoring services. The module may also include biasing circuitry 2530 for providing bias sequence, bias control, bias detecting and thermal management to the LPA/PA/HPA module 2500.

It is thus an aspect of embodiments of the present subject matter to provide low power consumption and a high linearity architecture. For example, current synchronous digital hierarchy ("SDH"P) radios generally utilize traditional back-up from a PldB approach to achieve the respective system's overall linearity (1M3) requirements. However, embodiments of the present subject matter may provide an aspect of a high efficiency bias for the PA or the Doherty Method and/or bias control for thermal management. For example, the transmitter architecture may maximize the PA minimum time between failure ("MTBF") and achieve optimum power consumption through the bias control concept in which the radio automatically sets the current of the last two stage power amplifiers 2515, 2520 as a function of the current output power level. This automatic aspect may be provided through software or hardware and may thus be programmable. Thus, as the bias point of the main amplifier 2515 in the Doherty amplifier is turned down, the linear output power decreases. Adaptive pre-distortion may also continue to improve the linearity of the composite amplifier to maintain the mask. Thus, as the bias is turned down, linearity degrades, but the consumed DC power falls more quickly thereby enabling a net decrease in DC power consumption while continuing to meet the mask requirement.

Further, through the adaptive mechanism of transmitter architecture according to certain embodiments of the present subject matter, power efficiency may be improved by the utilization of high efficiency bias such as Class AB or the Doherty method. For example, an optimum Class A/AB amplifier stage may be utilized in an embodiment of the present subject matter. This main carrier amplifier may then used as the core of a Doherty amplifier by using an identical peaking amplifier biased in Class C or deep AB. The bias points of the main and peaking amplifiers and the post-amplifier combining network may then be optimized to provide an optimum linear power over the required dynamic range and bandwidth. Table 7 below provides a listing of LPA/PA/HPA module specifications according to one embodiment of the present subject matter; however, such a listing should not in any way limit the scope of the claims appended herewith.

TABLE 7

| | |
|---|---|
| Gain | LPA: |
| | 6 GHz: 27-4 dB |
| | 7/8 GHz: 25-39 dB |
| | 10/11 GHz: 23-37 dB |
| | PA Standard: |
| | 6 GHz: 33-47 dB |
| | 7/8 GHz: 31-45 dB |
| | 10/11 GHz: 29-43 dB |
| | HPA: |
| | 6 GHz: 36-50 dB |
| | 7/8 GHz: 34-48 dB |
| | 10/11 GHz: 32-46 dB |
| Maximum Input level | 0 dBm |
| Minimum Input level | Standard PA: −56 dBm |
| | HPA: −46 dBm |
| Input IM3 | −56 dBc min. |
| Input Return Loss | 12 dB min. |
| Output IM3 S.C.L.@ LPA: | −37 dBc min. |
| 6 GHz: 23.5 dBm | |
| 7/8 GHz: 22.5 dBm | |
| 10/11 GHz: 19.5 dBm | |
| Standard PA: | |
| 6 GHz: 29.5 dBm | |
| 7/8 GHz: 28.5 dBm | |
| 10/11 GHz: 25.5 dBm | |
| HPA: | |
| 6 GHz: 32.5 dBm | |
| 7/8 GHz: 31.5 dBm | |
| 10/11 GHz: 28.5 dBm | |
| Output Return Loss | 15 dB min. |
| 2nd RF harmonic rejection | <=−50 dBm when F <= 21.2 GHz |
| | <=−30 dBm when F > 21.2 GHz |
| Spurious | −50 dBc max. F: +10 kHz to 25 kHz |
| | −10 kHz to−25 kHz |
| | −65 dBc max. F: +25 kHz to 10 MHz |
| | −25 kHz to −10 MHz |
| | −90 dBc max. F: +10 MHz to 100 MHz |
| | −10 MHz to−100 MHz |
| | −45 dBc max, F: =/−100 MHz and beyond |
| Coupling factor | LPA: |
| | 6 GHz: 25 dB +/− 1 dB |
| | 7/8 GHz: 28 dB +/− 1 dB |
| | 10/11 GHz: 34 dB +/− 1 dB |
| | PA Standard: |
| | 6 GHz: 24 dB +/− 1 dB |
| | 7/8 GHz: 27 dB +/− 1 dB |
| | 10/11 GHz: 33 dB +/− 1 dB |
| | HPA: |
| | 6 GHz: 21 dB +/− 1 dB |
| | 7/8 GHz: 24 dB +/− 1dB |
| | 10/11 GHz: 30 dB +/− 1dB |
| Noise Figure | 8 dB max. |
| DC Suppliers (with adaptive pre-distortion and with efficiency bias) | 6/7/8/10/11 GHz LPA: 5 V/120 mA −5 V/20 mA, 7.5 V/800 mA |
| | 6/7/8/10/11 GHz PA: 5 V/120 mA, −5 V/20 mA, 7.5 V/800 mA, 12.5 V/1280 mA |
| | 6/7/8/10/11 GHz LPA: 5 V/120 mA, −5 V/20 mA, 7.5 V/800 mA, 12.5 V/2 160 mA |
| DC Suppliers (with adaptive pre-distortion and without efficiency bias) | 6/7/8/10/11 GHz LPA: 5 V/120 mA, −5 V/20 mA, 7.5 V/800 mA, 12.5 V/800 mA |
| | 6/7/8/10/11 GHz LPA: 5 V/20 mA, −5 V/20 mA, 7.5 V/800 mA, 12.5 V/1600 mA |

TABLE 7-continued

| | |
|---|---|
| DC Suppliers (without adaptive pre-distortion and without efficiency bias) | 6/7/8/10/11 GHz LPA: 5 V/20 mA, −5 V/20 mA, 7.5 V/800 mA, 12.5 V/2700 mA<br>6/7/8/10/11 GHz LPA 5 V/120 mA −5 V/20 mA, 7.5 V/800 mA. 12/5 V/700 mA<br>6/7/8/10/11 GHz PA: 5 V/120 mA, −5 V/20 mA, 7.5 V/800 mA, 12.5 V/3000 mA<br>6/7/8/10/11 GHz LPA: 5 V/120 mA, −5 V/20 mA, 7.5 V/800 mA, 12.5 V/4500 mA |
| PA bias control (3 lines) (microprocessor to PA or HPA) | Connects to 10 bits DAC<br>Range: 0-3 V<br>Resolution: 3 mV |
| PA current control (3 lines) (PA or HPA to microprocessor) | Connects to 10 bits ADC<br>Range: 0-3 V<br>Resolution: 3 mV |

With reference to FIG. 19A, a Digital board 1920 according to an embodiment of the present subject matter generally comprise a Waveform Processing section 1921, a microprocessor section 1924, and an adaptive pre-distortion section 1925 as well as DAC circuitry and filters. The Waveform Processing section 1921 may provide a plurality of functions. The Waveform Processing section 1921 may provide data selection and termination. Traffic may be selected from 1.5 Gb backplane streams, and the data envelopes may be terminated, subdivided, and/or repackaged or any combination thereof. In an additional embodiment, traffic may also be provided from redundant DPUs over SONET framed 1.5 Gb links Traffic may then be selected hitlessly from one or the other DPU based upon the status of the links. Exemplary traffic types selected and passed through to the airlink formatter or terminated for cross-connecting may be, but are not limited to AU3, AU4, STS-1, DS3, Ethernet over T1.5, VT1.5. Reliability information may be included to enable hardware-controlled diversity and 1:N protection. The service channel data may be packaged into a separate backplane container. Further, airlink data payload may be framed into an STS-24 stream along with the service channel container. The link status for these containers may also be collected and reported to a main controller (not shown).

The Waveform Processing section 1921 may also provide airlink formatting. Thus depending upon the RF traffic, data units may be compressed for bandwidth efficiency and a schedule may stuff data bytes into respective forward error correction (FEC) blocks. Embodiments of the present subject matter may further transport various airlink containers over an airlink. For example, AU3, AU4, STS-3, NxVT1.5, 1-3xSTS-1, 1-4xDS3, NxEthernet over VT1.5, and 28DS1/DS3 are exemplary airlink containers; however, such examples should not in any way limit the scope of the claims appended herewith. These airlink containers may require decompression or may already be decompressed and may be scheduled into FEC blocks where stuffing may occur. For example, generation of airlink containers may be coordinated with other transmitters in the shelf(ves) so that identical containers received at the far end from other transmitters may be provided for Differential Absolute Delay Equalization ("DADE") for hitless switching.

The Waveform Processing section 1921 may generate waveforms and provide FEC. For example, data blocks may be mapped to a QAM constellation or other constellation and filtered using an appropriate waveform filter. Alternative embodiments may add training overhead as necessary. Interpolation and filtering may also be applied to provide baseband samples at 200.0 Msps to a dual DAC; however, such an example is not intended to limit the scope of the claims appended herewith. Exemplary FEC may be Reed-Solomon ("RS"), 2D-Trellis Coded Modulation ("TCM") and 4D-TCM, or another known FEC process. For example, a RS block encoder may provide a block size from 50-255 bytes, T=3 to 10. A TCM encoder may be implemented to encode 2D or 4D schemes at the symbol level. A block or convolutional interleaver may also be provided as necessary. For example, a convolutional interleaver with programmable rows and delay may also be implemented when TCM is utilized with latency-sensitive applications. In embodiments of the present subject matter, the data payload may be scrambled after the interleaver. Further, the seed may be manually reset after a programmable number of blocks. Embodiments of the present subject matter may employ a Nyquist filter to generate an appropriate waveform shape. A fractional resampler may unsample the signal to an integer fraction of 100 Msps. The fractional resample may alternatively be phase-locked to a reference signal from the primary or secondary DPU.

Further, pre-distortion corrections may be applied in embodiments of the present subject matter. For example, the samples may be applied to a dual DAC and filtered with an analog Nyquist filter. By DC coupling the DAC interface, carrier feedthrough nulling may be provided. A mechanism for IQ phase imbalance compensation may also be implemented in additional embodiments of the present subject matter that involve use of the pre-distortion feedback signal or measurement at the far end of the airlink A monitor port at the output of the IQ modulator in the IF upconverter section may also be included to verify the spectral mask and spurious emissions of the digital modulator.

Figure 26:
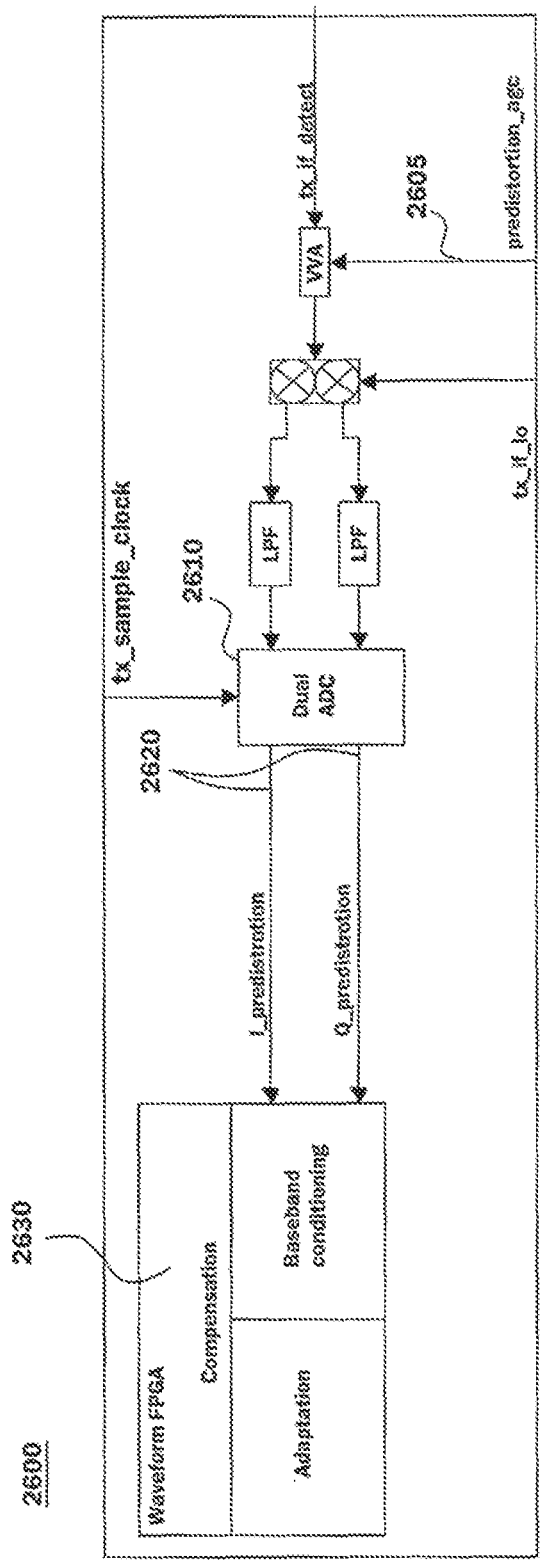
FIG. 26 is a diagram of an adaptive pre-distortion section according to an embodiment of the present subject matter.

The Waveform Processing section 1921 may further provide pre-distortion adaptation and compensation. FIG. 26 is a diagram of art adaptive pre-distortion section according to an embodiment of the present subject matter. With reference to FIG. 26, the adaptive pre-distortion section 2600 receives baseband samples 2620 from a dual ADC 2610 at a Tx sample rate. An automatic gain control ("AGC") signal 2605 may be provided to optimize the level into the ADC 2610 for a maximum SNR. An appropriate range for the AGC signal 2605 may be greater than 30 dB; however, such a range is not intended to limit the scope of the claims appended herewith. The samples may be buffered and processed by a programmable digital signal processor ("DSP"). The DSP may be internal or external to a waveform field programmable gate array ("FPGA") 2630. Embodiments of the present subject matter may employ processing comprising IQ imbalance correction, time alignment, and/or level correction. The correction function may be implemented by a 5th-order polynomial or other known means or may also be adapted by slowly changing the correction function so that the output power is continuous with no generation of spurious or fast transient signals. The pre-distortion circuitry may also track ATPC and may also provide an indication of the health of the transmitter module. The circuitry may provide correlations utilized for both time alignment and/or predistortion parameters. For example, measured samples of the PA output may be compared to desired samples and a pre-distortion correction may be generated and applied to each sample to reduce spectral growth.

Adaptive pre-distortion techniques employed by certain embodiments of the present subject matter may thus assist in providing low power consumption and a better linearity performance. For example, the adaptive pre-distortion technique may achieve linearity improvement by learning the respective LPA/PA/HPA AM/PM and AM/AM curves and applying an inverse response to the digital baseband signals. By recovering samples of transmitted signals via a sense path after the LPA/PA/HPA, the samples may be conditioned and time-aligned with desired samples and then utilized to adapt the pre-distortion correction to the inverse of the AM/PM and AM/AM curves. Table 8 below provides a listing of Adaptive Pre-Distortion section specifications according to one embodiment of the present subject matter; .however, such a listing should not in any way limit the scope of the claims appended herewith.

TABLE 8

| ADC Input Level | 1 Vpp |
|---|---|
| AGC Range | 30 dB |
| Baseband Bandwidth | 45 MHz −3 db |
| | Flatness 0.5 db 0-45 MHz |

With reference to FIG. 19A, the microprocessor section 1924 may be one, plural or a combination of microcontroller, microprocessor, FPGA or other suitable devices. The microcontroller section 1924 maybe utilized to poll for alarms from various components of the transmitter and report the alarms to a signal processing unit ("SPU") (not shown). The microcontroller section may set frequency, output power, and mute functions of the transmitter as a function of a radio command and may also control the transmitter through switch settings and power management. The microcontroller may report transmitter status such as output power level and transmitter temperature. Further, the microcontroller may provide communication with additional transmitter modules utilizing local receiver USB ports to communicate through external RF monitor software and/or utilizing the SPU through the backplane to communicate via embedded firmware.

One aspect of the present subject matter provides a unique simple calibration procedure. With a wider, accurate mixing down detector closed loop mechanism, transmitters according to embodiments of the present subject matter may support simple one-point power calibration procedure. Additional embodiments may also support one-point field calibration procedure through a keypad interface thus providing a special feature for meeting high accuracy and instant field calibration requirement.

Thus, one embodiment of the present subject matter provides a radio frequency transmitter. The radio frequency transmitter may comprise a modem which receives one or more input data signals and an adaptive predistortion signal and provides a baseband I signal and a baseband Q signal. The transmitter may further comprise a power amplifier module which receives the I and Q signals and provides a RF output signal. A predistortion module receives the RF signal, downconverts the RF signal to an IF signal, downconverts the IF signal to a baseband feedback signal, and samples the feedback signal to provide the adaptive predistortion signal to the modem. An alternative embodiment may further comprise a dynamic range power control module including a root-mean-squared ("RMS") power detector and a variable attenuator operating on the IF signal. Embodiments of the present subject matter may employ a Doherty amplifier as the power amplifier module and the module may include a programmable bias control module that adjusts a bias signal to an amplifier in the power amplifier module as a function of an output power level thereof. An additional embodiment may further comprise a dual loop synthesizer having a first loop with a bandwidth of approximately 15 KHz and a second loop with a bandwidth of approximately 1 MHz. A further embodiment may also comprise a temperature compensation module including a first temperature sensor located m proximity to an RF detector circuit, the sensor controlling a fan as a function of the temperature of the RF detector circuit. The module may also include a second temperature sensor located in proximity to the power amplifier module.

An additional embodiment of the present subject matter provides a radio frequency transmitter system comprising an electronics rack having an electrical backplane, a plurality of radio frequency transmitters each operatively connected to the backplane. The transmitters may each comprise a modem which receives one or more input data signals and an adaptive predistortion signal and provides a baseband I and Q signal, a power amplifier module which receives the I and Q signals and provides an RF output signal, and a predistortion module which receives the RF signal, downconverts the RF signal to an IF signal, downconverts the IF signal to a baseband feedback signal, and samples the feedback signal to thereby provide the adaptive predistortion signal to the modem. The transmitters may further comprise a local reference signal generator and a frequency locking circuit. Embodiments of the system may comprise a DPU operatively connected to the backplane, the DPU having a first and a second common reference signal generator where each said local reference generator is switchably connected to the first common reference signal generator via the frequency locking circuit. The DPU may further comprise a second switch adaptable to switch from a first of the plural transmitters to a second of the plural transmitters where the switching occurs as a result of an error or failure in the first transmitter or occurs as function of a quality measurement of the RF signal.

A further embodiment of the present subject matter provides a method for transmitting a signal. The method comprises the steps of providing a co-located modem and transmitter in an assembly, receiving data, and a pre-distortion signal in the co-located modem to provide a first signal, and converting the first signal to a baseband signal. The method further comprises providing a synthesizer that generates plural reference signals for use by the modem and transmitter, modulating the baseband signal, and amplifying the modulated signal with an amplifier. The method also comprises demodulating the amplified signal with distortion circuitry to provide the pre-distortion signal, and transmitting the amplified signal with a transmitter. An additional embodiment may provide bias points of the amplifier during thermal control. Embodiments may also compensate the modulated signal for temperature changes in the amplifier and provide a common, reference signal to the modem and transmitter. Alternative embodiments may lock the local oscillator to a reference frequency as a function of an alarm and also calibrate the amplified signal. The method may further comprise switching to a standby transmitter to transmit the amplified signal if the transmitter fails.

As shown by the various configurations and embodiments illustrated in FIGS. 1-26, a system, method and apparatus for a radio frequency transmitter have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A radio frequency transmitter comprising:
a modem configured to modulate one or more input data signals to generate a first modulated signal;
an upconversion module configured to receive the first modulated signal and to generate a first radio frequency ("RF") signal based on the first modulated signal;
a power amplifier configured to amplify the first RF signal to generate a first amplified RF signal, the power amplifier nonlinearly causing first distortion in the first amplified RF signal;
a feedback module configured to receive at least a portion of the first amplified RF signal and to downconvert the at least a portion of the first amplified RF signal to generate a downconverted feedback signal;
a predistorter configured to add predistortion to a second modulated signal based on the downconverted feedback signal to reduce second distortion in a second RF amplified signal, the second distortion being caused by the power amplifier; and
an attenuator configured to attenuate power of the second modulated signal based on the downconverted feedback signal to further reduce the second distortion in the second amplified RF signal.

2. The transmitter of claim 1 wherein the upconversion module is configured to generate an intermediate frequency ("IF") signal from the first modulated signal and generate the first RF signal from the IF signal, the transmitter further comprising a dynamic range power control module including a root-mean-squared ("RMS") power detector and a variable attenuator operating on the IF signal.

3. The transmitter of claim 1 wherein the power amplifier is a Doherty amplifier.

4. The transmitter of claim 3 further comprising a programmable bias control module.

5. The transmitter of claim 4 wherein the programmable bias control module adjusts a bias signal to the power amplifier as a function of an output power level of the power amplifier.

6. The transmitter of claim 1 further comprising a dual loop synthesizer.

7. The transmitter of claim 1 further comprising a temperature compensation module.

8. The transmitter of claim 7 wherein the temperature compensation module includes a first temperature sensor located in proximity to an RF detector circuit, the first temperature sensor controlling a fan as a function of a temperature of the RF detector circuit.

9. The transmitter of claim 8 wherein the temperature compensation module includes a second temperature sensor located in proximity to the power amplifier.

10. A method for transmitting a signal comprising the steps of:
providing a co-located modem and transmitter in an assembly;
receiving at the modem one or more input data signals;
generating, by the modem, a first modulated signal by modulating the one or more input data signals;
upconverting the first modulated signal to generate a first radio frequency ("RF") signal;
amplifying, by a power amplifier, the first RF signal to generate a first amplified RF signal, the amplifying of the first RF signal by the power amplifier nonlinearly causing first distortion in the first amplified RF signal;
transmitting the first amplified RF signal with a transmitter;
downconverting at least a portion of the first amplified RF signal to generate a downconverted feedback signal;
adding predistortion to a second modulated signal based on the downconverted feedback signal to reduce second distortion in a second RF amplified signal, the second distortion being caused by the power amplifier; and
attenuating power of the second modulated signal based on the downconverted feedback signal to further reduce the second distortion in the second RF amplified signal.

11. The method of claim 10 further comprising providing thermal control for optimizing bias points of the power amplifier.

12. The method of claim 10 further comprising compensating the first RF signal for temperature changes in the power amplifier.

13. The method of claim 10 further comprising providing a common reference signal to the modem and transmitter.

14. The method of claim 10 further comprising:
providing plural references signals to modem and transmitter;
locking the plural reference signals to a reference frequency as a function of an alarm.

15. The method of claim 10 further comprising the step of calibrating the first amplified RF signal.

16. The method of claim 10 further comprising the step of switching to a standby transmitter to transmit the first amplified RF signal if the transmitter fails.

17. The method of claim 10 further comprising providing a synthesizer that generates plural reference signals for use by the modem and transmitter, wherein the synthesizer is a dual loop synthesizer.

18. The method of claim 10 wherein upconverting the first modulated signal to generate the first RF signal further comprises:
upconverting the first modulated signal to an intermediate frequency ("IF") signal; and
upconverting the IF signal to generate the first RF signal.

* * * * *